US010862860B2

(12) United States Patent
Andrew et al.

(10) Patent No.: US 10,862,860 B2
(45) Date of Patent: *Dec. 8, 2020

(54) REBALANCING INTERNET PROTOCOL (IP) ADDRESSES USING DISTRIBUTED IP MANAGEMENT

(71) Applicant: EMC IP Holding Company LLC, Hopkinton, MA (US)

(72) Inventors: Patrick Andrew, Olympia, WA (US); Alexander Bahm, Seattle, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/861,695

(22) Filed: Apr. 29, 2020

(65) Prior Publication Data

US 2020/0259784 A1 Aug. 13, 2020

Related U.S. Application Data

(63) Continuation of application No. 16/179,329, filed on Nov. 2, 2018, now Pat. No. 10,681,003.

(51) Int. Cl.
*H04L 29/12* (2006.01)
*H04L 29/08* (2006.01)
*G06F 3/06* (2006.01)

(52) U.S. Cl.
CPC .......... *H04L 61/2015* (2013.01); *G06F 3/061* (2013.01); *G06F 3/067* (2013.01);
(Continued)

(58) Field of Classification Search
CPC ............. H04L 61/2015; H04L 67/1097; H04L 61/2092; H04L 61/2053; H04L 61/2061;
(Continued)

(56) References Cited

U.S. PATENT DOCUMENTS 6,957,276 B1 10/2005 Bahl
7,764,773 B2 * 7/2010 Haumont ............... H04M 17/10
379/114.17
(Continued)

OTHER PUBLICATIONS

Notice of Allowance received for U.S. Appl. No. 16/179,329 dated Jan. 30, 2020, 46 pages.
(Continued)

*Primary Examiner* — Gil H. Lee
*Assistant Examiner* — Chhian (Amy) Ling
(74) *Attorney, Agent, or Firm* — Amin, Turocy & Watson, LLP

(57) ABSTRACT

A balanced distribution of IP addresses across nodes of a cluster is performed during distributed IP management, wherein IP addresses are dynamically procured and assigned on a first-come, first-serve basis. In one aspect, nodes that participate in distributed IP management can request for IP addresses only if they are determined to be serviceable. A subscription level of a node can be determined based on a maximum number of IP address that can be claimed/owned by the node. As an example, the maximum number of IP address can be evaluated based on a total number of serviceable nodes within the cluster. IP address redistribution can be facilitated to ensure that subscription levels of the nodes are at an optimal level.

20 Claims, 20 Drawing Sheets

(52) U.S. Cl.
CPC ........ *G06F 3/0653* (2013.01); *H04L 61/2053* (2013.01); *H04L 61/2092* (2013.01); *H04L 67/1002* (2013.01); *H04L 67/1097* (2013.01)

(58) Field of Classification Search
CPC . H04L 67/1002; G06F 3/0653; G06F 3/0658; G06F 3/061; G06F 3/067
See application file for complete search history.

(56) References Cited

U.S. PATENT DOCUMENTS

| | | |
|---|---|---|
| 2010/0131973 A1 | 5/2010 | Dillon et al. |
| 2013/0326066 A1 | 12/2013 | Shalberg et al. |
| 2013/0346618 A1 | 12/2013 | Holkkola |
| 2014/0233587 A1 | 8/2014 | Liu et al. |
| 2016/0127509 A1 | 5/2016 | Uriel |
| 2016/0255514 A1* | 9/2016 | Kim .................. H04L 61/2023 370/254 |
| 2017/0093790 A1 | 3/2017 | Banerjee et al. |
| 2019/0021117 A1 | 1/2019 | Zhou et al. |
| 2019/0104398 A1 | 4/2019 | Owen et al. |

OTHER PUBLICATIONS

Office Action for U.S. Appl. No. 16/177,304 dated Apr. 15, 2020, 26 pages.
Final Office Action received for U.S. Appl. No. 16/177,304 dated Aug. 24, 2020, 29 pages.

\* cited by examiner

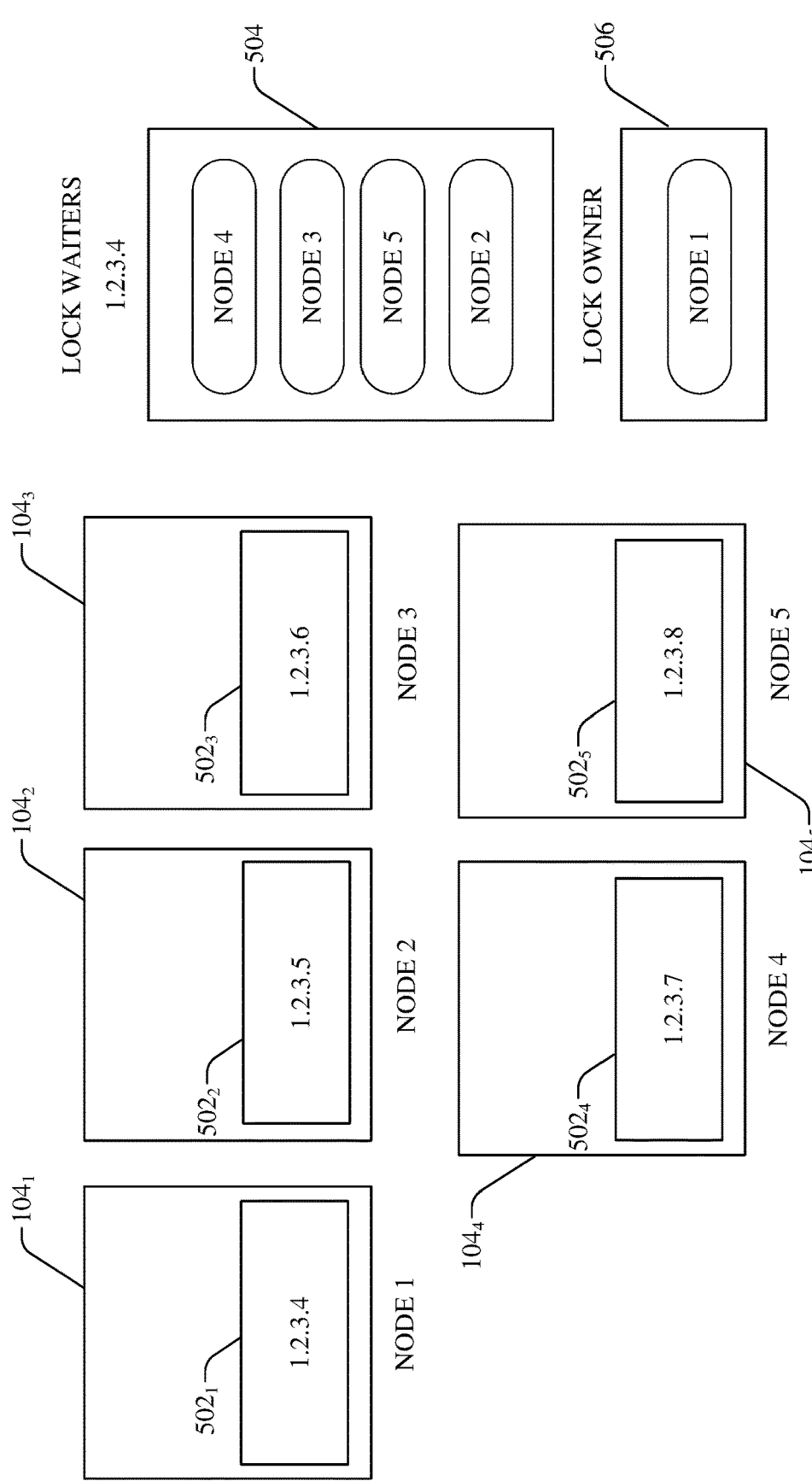

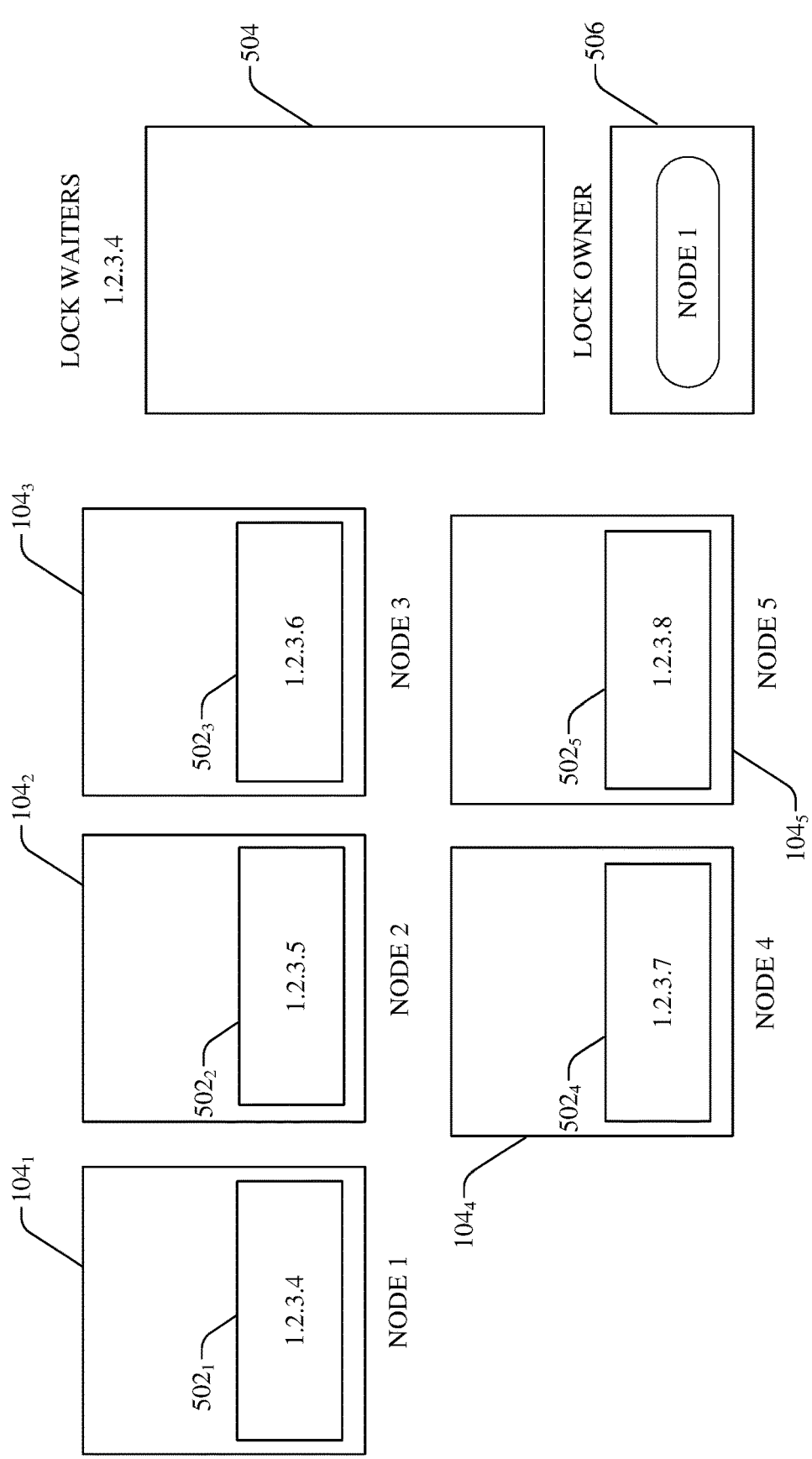

REBALANCING INTERNET PROTOCOL (IP) ADDRESSES USING DISTRIBUTED IP MANAGEMENT

RELATED APPLICATION

The subject patent application is a continuation of, and claims priority to, U.S. patent application Ser. No. 16/179,329 (now U.S. Pat. No. 10,681,003), filed Nov. 2, 2018, and entitled "REBALANCING INTERNET PROTOCOL (IP) ADDRESSES USING DISTRIBUTED IP MANAGEMENT," the entirety of which application is hereby incorporated by reference herein.

TECHNICAL FIELD

The subject disclosure relates generally to a system and method that facilitates rebalancing Internet protocol (IP) addresses using distributed IP management, for example, in a coordinated system.

BACKGROUND

The large increase in amount of data generated by digital systems yearns for more sophisticated approaches to data storing, processing, and analyzing. In this context, scale-out network-attached storage (NAS) systems have proved popular as a technology for managing this "Big Data." Some scale-out NAS systems utilize a virtual Internet protocol (IP) failover scheme based on dynamic IP address allocation that distributes IP addresses to nodes participating in the IP address pool assigned to the NAS cluster. When allocating dynamic IP addresses within a clustered system, coordination of IP address ownership is critical to cluster operations. Moreover, the coordination is exclusive, i.e., only one network interface attached to a host (e.g., node of the NAS cluster) can own a network visible IP address at a time. A host can advertise ownership of an IP address by sending an Address Resolution Protocol (ARP) packet to a switch. Two or more network hosts attempting to claim the same IP address via ARP can lead to packet routing problems, known as an ARP conflict, on the network, resulting in the hosts becoming unreachable.

To avoid such ARP conflicts, IP management can be implemented, wherein a central IP manager can assign and revoke IP addresses exclusively to the hosts that are being managed. However, IP management via the single/central coordinator can have several drawbacks. For example, the coordinator is a single point of failure. In addition, the coordinator should be aware of each individual host's local state. As the size of the system grows, the amount of local state being replicated becomes untenable, and the likelihood of failure can significantly increase. These issues can cause problems in large distributed systems.

Instead of a central coordinator, a distributed IP management system can be implemented wherein IP addresses are dynamically procured by the hosts and assigned on a first-come, first-serve basis. However, in this scenario, a single host can be oversubscribed with IP addresses, resulting in an unbalanced distribution of IP addresses across a distributed system. This can lead to uneven resource usage and decrease the fault tolerance of the distributed system.

The above-described background relating to file systems is merely intended to provide a contextual overview of some current issues and is not intended to be exhaustive. Other contextual information may become further apparent upon review of the following detailed description.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

Example systems and methods disclosed herein relate to rebalancing internet protocol (IP) addresses across nodes of a clustered system that employs distributed IP address management and coordination. In one example embodiment, a system is disclosed that comprises a processor and a memory that stores executable instructions that, when executed by the processor, facilitate performance of operations. Moreover, the operations comprise: determining a number of serviceable node devices within the clustered system, wherein the serviceable node devices comprise node devices that are capable of serving traffic destined for an IP address; based on the number of serviceable node devices, determining level data indicative of a level of IP address subscription associated with the node device; and in response to determining that the level data satisfies a defined oversubscription criterion, releasing a resource associated with the IP address to facilitate balanced IP address distribution across the clustered system.

Another example embodiment of the specification relates to a method that comprises: based on serviceable node devices within a clustered system that employs distributed IP address management, determining, by a node device of clustered system that comprises a processor, information representing a maximum number of IP addresses that are allowed to be claimed by the node device, wherein serviceable node devices are node devices that are capable of servicing traffic destined for an IP address; based on the information, determining level data indicative of a level of IP address subscription associated with the node device; and in response to determining that the level data satisfies a defined oversubscription criterion, canceling an outstanding IP address request transmitted from the node device to a distributed lock coordination component that is employable to grant IP address requests.

Another example embodiment of the specification relates to a computer-readable storage medium comprising instructions that, in response to execution, cause a system comprising a processor to perform operations, comprising: determining, based on serviceable node devices within the clustered system that are capable of servicing traffic destined for an IP address, information representing a maximum number of IP addresses that are allowed to be claimed by the node device, wherein the clustered system employs distributed IP address management. The operations further comprise: based on the information, determining level data indicative of a level of IP address subscription associated with the node device; and in response to determining that the level data satisfies a defined oversubscription criterion, canceling an outstanding IP address request transmitted from the node device to a distributed resource coordination component that is employable to grant IP address requests.

The following description and the drawings set forth certain illustrative aspects of the specification. These aspects are indicative, of but a few of the various ways in which the principles of the specification may be employed. Other advantages and novel features of the specification will become apparent from the detailed description of the specification when considered in conjunction with the drawings.

BRIEF DESCRIPTION OF THE DRAWINGS

FIGS. 5A-5F illustrate example systems that depict balanced IP address redistribution based on a retroactive policy.

FIGS. 6A-6E illustrate example systems that depict balanced IP address redistribution based on a proactive policy.

DETAILED DESCRIPTION

Figure 1:
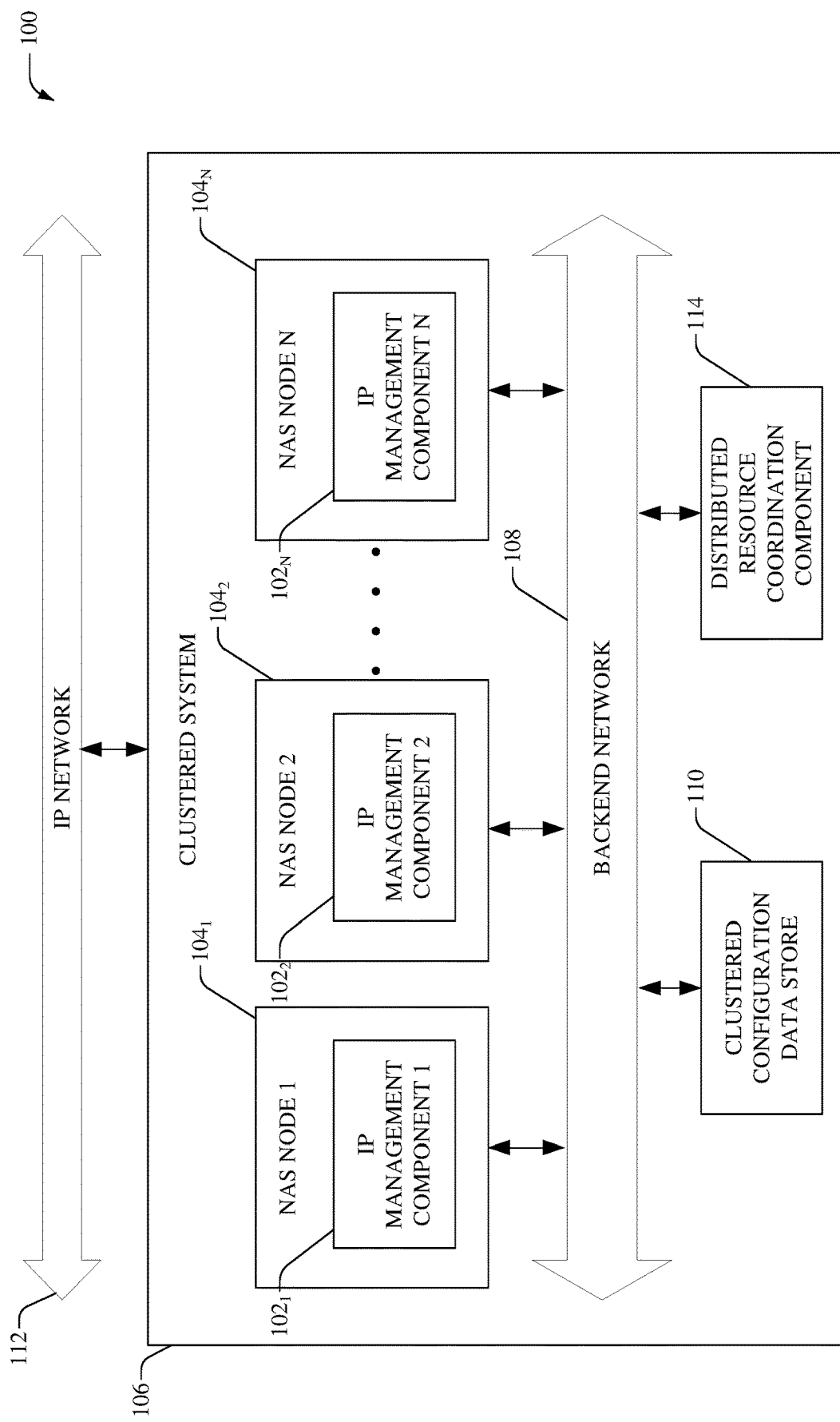
FIG. 1 illustrates an example system that facilitates distributed internet protocol (IP) address management in a storage cluster.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

Example systems and methods disclosed herein, in one or more embodiments, relate to a scale-out network attached storage (NAS) platform that combines modular hardware with unified software to harness unstructured data. In one aspect, the NAS platform can comprise a cluster of nodes that delivers a scalable pool of storage with a global namespace. The NAS platform's unified software provides centralized web-based and command-line administration to manage at least the following features: (i) a cluster that runs a distributed file system; (ii) scale-out nodes that add capacity and performance; (iii) storage options that manage files and tiering; (iv) flexible data protection and high availability; and/or (v) software modules that control costs and optimize resources.

Hosts (e.g., nodes) within the NAS platform can advertise ownership of an internet protocol (IP) address by sending an Address Resolution Protocol (ARP) packet to a network switch. When two (or more) network hosts attempt to claim the same IP address via ARP, a routing problem, for example, an ARP conflict, is created on the network, resulting in either host to be unreachable. IP address management can be used to prevent ARP conflicts, wherein a manager must assign, and revoke IP addresses exclusively to the hosts that are being managed. Conventionally, IP address assignment is performed through a central coordinator host that allocates each Host:IP address assignment (e.g., similar to Dynamic Host Configuration Protocol (DHCP)). However, these conventional systems (e.g., utilizing a central/single coordinator for IP address assignments) have several drawbacks, for example, the central/single coordinator is a single point of failure, and the central/single coordinator has to determine each individual host's local state in order to make IP addressing assignments. As the size of a system with a central coordinator grows, the amount of local state being replicated becomes untenable, and the likelihood of failure increases. To overcome the above noted challenges a different model for IP address ownership, herein referred to as "Dynamic Ownership," can be implemented, wherein IP address management is distributed across the hosts of the clustered system. Dynamic ownership of IP addresses is determined on a first-come, first-serve basis (e.g., a host that claims an IP address first gets to use it first). Moreover, each host can choose to participate in IP address ownership based on its own network status and thus, eliminate the single/central IP address coordinator and the state synchronizes to that central coordinator. However, since ownership of resources (e.g., IP addresses) is on a first-come, first-serve basis, oftentimes the distribution of IP addresses across hosts may not be balanced. This can result in uneven resource usage and/or decrease a fault tolerance of the NAS system.

Systems and methods disclosed herein facilitate a balanced distribution of IP addresses across hosts during distributed IP management. In one aspect, hosts that participate in distributed IP Management can request for IP addresses only if they are determined to be serviceable. A defined policy can be utilized to determine a maximum number of IP address that can be claimed/owned by a host of a cluster.

Referring initially to FIG. 1, there illustrated is an example system 100 that facilitates distributed IP address management in a storage cluster, according to one or more aspects of the disclosed subject matter. In one aspect, IP management components 1-N ($102_1$-$102_N$; wherein N is most any integer) of NAS nodes 1-N ($104_1$-$104_N$) within a clustered system 106 can facilitate distributed IP address management and rebalancing.

As an example, the NAS nodes 1-N ($104_1$-$104_N$) can store large volumes of data, such as Big Data, which is typically mined for information and/or patterns. Big Data is characterized by the large amount of data, the different types of data, and/or the rate at which the data must be processed. For example, Big Data can refer to, but is not limited to, petabytes and/or exabytes of data, that need specialized approaches to storage and/or analysis. According to an aspect, the Big Data stored within NAS nodes 1-N ($104_1$-$104_N$) can comprise raw data and metadata associated with the raw data. A set of clients, for example, Network File System (NFS) clients (not shown), can connect (e.g., simultaneously and/or substantially simultaneously) to the NAS nodes 1-N ($104_1$-$104_N$) via a network interface of an IP network 112 to access the stored data. As an example, the clients can read, write, add, and/or delete data based on access privileges assigned to the clients. In one embodiment, the system 106 intelligently manages client connections such that client connections are transparent and appear as a single network element to the client device; client connections are balanced evenly across all the nodes 1-N ($104_1$-$104_N$), varying levels of services can be provided to the clients based on defined parameters; resilient and/or reliable connections can be provided; etc. Moreover, the system 106 can provide always-on access to the client devices.

In an aspect, system 106 can utilize a virtual IP failover scheme for a scale-out NAS that does not require any client-side drivers. As an example, system 106 utilizes dynamic IP, wherein IP addresses are distributed to nodes (e.g., nodes 1-N ($104_1$-$104_N$)) that are participating in an IP address pool (e.g., assigned to the system 106). If a node becomes unavailable (e.g., due to a failure, reboot, etc.), its IP address(es) is(are) automatically moved to another available node to preserve NFS connections to client devices.

Coordination of IP addresses (e.g., IPv4 and/or IPv6) is traditionally managed using a Dynamic Host Control Protocol (DHCP). DHCP is a single point of configuration for IP address management, wherein hosts on the network ask a DHCP server for an IP address (e.g., referred to as IP allocation). This can create significant challenges when the network and hardware configuration is not static. For a clustered system, IP addresses are grouped, for example, within the same subnet. When adding and removing hardware to the clustered system using DHCP, there is an additional administrative overhead of managing the DHCP host records for each of hardware for static IP allocation. In this scenario, there is a 1:1 relationship between MAC hardware address and IP address defined in DHCP, lending to maintenance overheads as the number of hosts increases. To solve this issue, the DHCP can be configured to dynamically assign unallocated IP addresses to new hosts on the network for a lease period. This works as hosts are added and deleted, but for a clustered system, having IP addresses that become unresolvable creates data availability problems. DHCP-assigned IP addresses are not re-distributed during a fault event (since the DHCP does not have information regarding the cluster status).

Removing the 1:1 association of IP addresses to hosts and allowing the IP addresses to be dynamically reassigned allows the IP address to be Highly Available (HA). This is referred to as a Dynamic IP address. A dynamic IP address allows the network to be oblivious to faults as the IP address moves between hosts in such scenarios. Accordingly, to provide dynamic IP addresses, IP address management can be delegated to the clustered system (e.g., system 106), that is aware of its own state and/or configuration. To accomplish this, the cluster is assigned a block of IP addresses or an IP address pool via the system administrator. Allocation rules such as static and/or dynamic are determined by the clusters network configuration. Static IP addresses are guaranteed to always be assigned to a single cluster host, while dynamic IP addresses can float between hosts depending on the allocation policy and/or cluster state.

In one aspect, clustered systems can self-manage IP addresses by sending ARP probes to verify if anyone is using a specific IP address. This approach has a network penalty of adding delay time to allow conflicting network hosts sufficient time to respond to probe requests. In another aspect, the cluster can centrally manage IP assignment. Since it is fully aware of its own state, it can reliably assign and revoke IP addresses to its members. In this scenario, IP address coordination is performed by utilizing a single coordinator, with a deterministic host running the coordinator. However, a single and/or central coordinator is a single point of failure. Further, rigid policies for determining which host runs the IP address coordinator can result in unnecessary movement of service IP addresses. This policy has no central coordinator, and sometimes multiple hosts have determined that they should be the IP address coordinator, incorrectly claiming the service IP address and creating ARP conflicts. In addition, the lack of serviceability checks combined with the rigid policies can cause IP addresses to be being assigned to nodes with unavailable services.

Referring back to FIG. 1, system 106 overcomes the above noted issues by utilizing a Dynamic Ownership model for IP address allocation and management. Dynamic Ownership is determined on a first-come, first-serve basis. The host that claims an IP address first gets to use it first. According to an embodiment, the IP management components 1-N ($102_1$-$102_N$) can determine IP address(es) that are to be claimed based on data stored within a clustered configuration data store 110 and can coordinate IP address ownership through a lock coordinator, for example, a distributed resource coordination component 114. In an aspect, the IP management components 1-N ($102_1$-$102_N$) can communicate with the clustered configuration data store 110 and the distributed resource coordination component 114 via a communication channel that is independent of the IP network 112 being assigned, for example, a via a backend network 108 (e.g., InfiniBand network, Ethernet network, etc.) that connects the nodes of cluster 106. As an example, the clustered configuration data store 110 can store data associated with the cluster 106, such as, but not limited to cluster/node configuration and/or state (e.g., cluster is upgrading, scaling up or out, etc.), network configuration data (e.g., subnet, netmask, gateway, virtual local area network (VLAN) information, available interfaces, available IP addresses, etc.), IP address pool (e.g., a block of IP addresses that have been delegated to the cluster), the host membership within an IP address pool.

Typically, a per-host IP manager (e.g., IP management components 1-N ($102_1$-$102_N$)) of a node (e.g., nodes 1-N ($104_1$-$104_N$)) can request for a lock (e.g., exclusive access) for a resource (e.g., file) associated with a specific IP address, and if granted, the per-host IP manager can create an IP resource object, apply the network data from the IP resource object to the interface on the node in order to set up the interface to receive traffic, and periodically issue checks to ensure that the node is allowed to own this IP resource object. Since each node participates in IP address ownership based on its own status, only the nodes eligible to participate in IP resource management will participate, significantly reducing overheads associated with synchronizing node state to a central IP address coordinator.

According to an embodiment, the IP management components 1-N ($102_1$-$102_N$) ensure that oversubscription of IP addresses to one (or more) nodes is avoided. Moreover, the IP management components 1-N ($102_1$-$102_N$) can determine a maximum number (and/or defined range) of IP addresses that can be requested by and/or claimed by a node. As an example, the maximum number of IP addresses can be calculated by dividing the total number of IP addresses within an IP address pool assigned to the cluster by a number of serviceable hosts/nodes within the cluster. A host/node is determined to be serviceable if it is fully capable of servicing traffic destined for an IP address. Further, most any operator-defined policies can be utilized to enable oversubscribed nodes (e.g., that have claimed ownership a set of IP addresses that is greater than the maximum number of IP address allowed) to release IP addresses and return to an under-subscribed or at-subscription state. As an example, utilizing host serviceability information (e.g., number of serviceable hosts instead of total number of hosts) avoids situations wherein the IP address distribution is not properly balanced, creating an under-subscribed situation where IP addresses may not be assigned due to an improper subscription level. The distributed IP management components 1-N ($102_1$-$102_N$) enable support for multiple IP addresses for a single subnet while increasing increases fault tolerance of the IP addresses based on the rebalancing mechanism disclosed herein.

In one example, the NAS nodes $104_1$-$104_N$ can comprise a node and cluster storage system such as an Dell EMC® Isilon® Cluster that operates under the OneFS® operating system and utilizes SmartConnect functionality that enables intelligent client connection load balancing and failover support. However, it is noted that the embodiments disclosed herein are not limited to the Dell EMC® Isilon® Cluster and can be utilized by most any storage platform such as but not limited to, VMware clustered services. Moreover, the embodiments disclosed herein can be applied in various technologies, such as, but not limited to containerization (e.g., applying dynamic IP addresses across an orchestrated container system), virtualization (e.g., applying dynamic IP addresses across a coordinated VM host), etc. Further, it is noted that the NAS nodes $104_1$-$104_N$ can comprise volatile memory(s) or nonvolatile memory(s) or can comprise both volatile and nonvolatile memory(s). Examples of suitable types of volatile and nonvolatile memory are described below with reference to FIG. 11. The memory (e.g., data stores, databases) of the subject systems and methods is intended to comprise, without being limited to, these and any other suitable types of memory.

Figure 2:
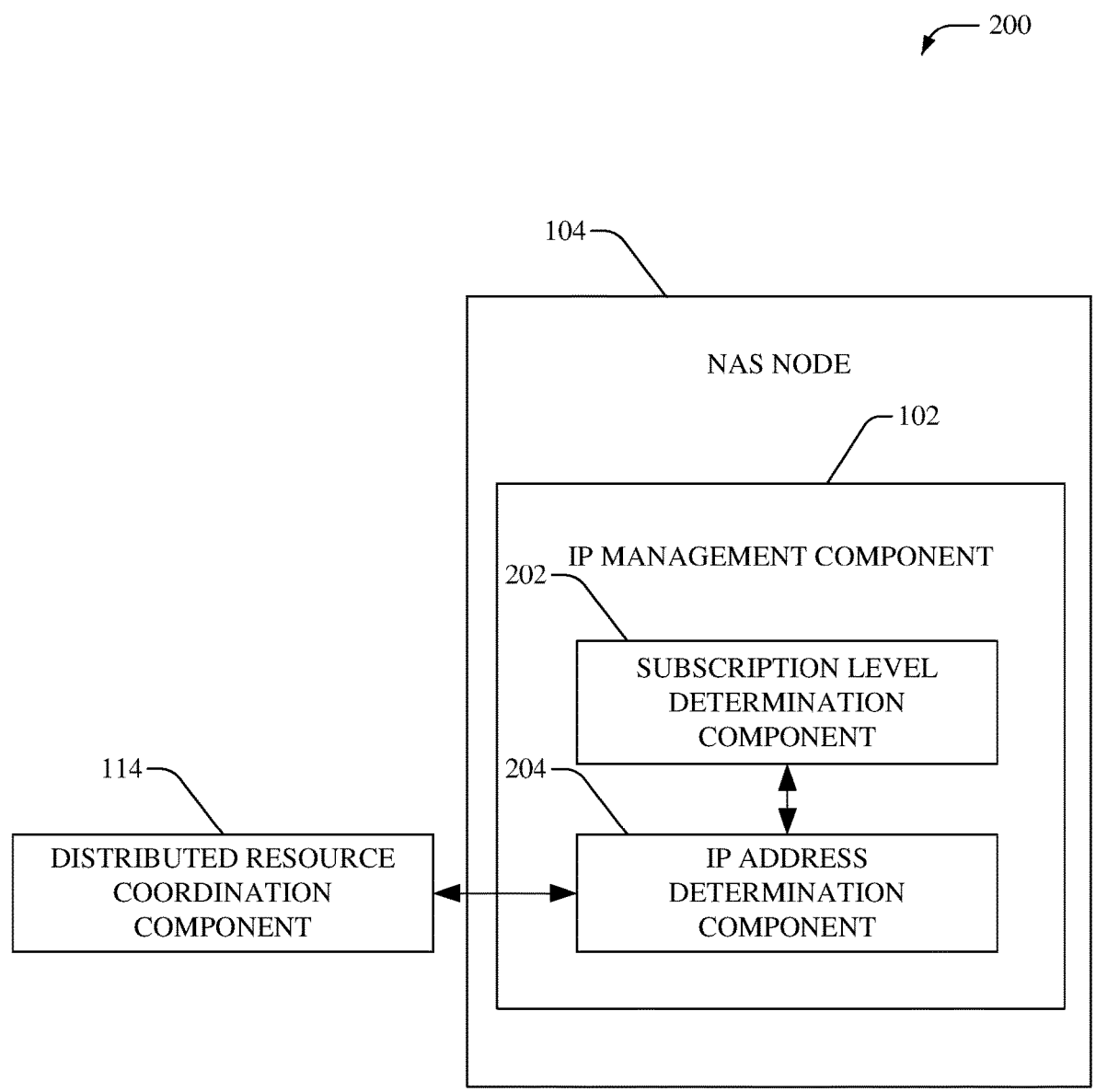
FIG. 2 illustrates an example system that facilitates IP address coordination based on a subscription level of a node.

Referring now to FIG. 2, there is illustrated an example system 200 that facilitates IP address coordination based on a subscription level of a node, according to an aspect of the specification. In one aspect, the system 200 can be utilized in highly available systems wherein delays in IP address assignments are to be avoided. It is noted that the IP management component 102 is substantially similar to the IP management components $102_1$-$102_N$ described with respect to system 100 and can include functionality as more fully described herein, for example, as described above with regard to the IP management components $102_1$-$102_N$. Further, NAS node 104 is substantially similar to the NAS nodes $104_1$-$104_N$ described with respect to system 100 and can include functionality as more fully described herein, for example, as described above with regard to the NAS nodes $104_1$-$104_N$. Furthermore, its is noted that the distributed resource coordination component 114 can comprise functionality as more fully described herein, for example, as described above with regard to system 100.

System 200 employs a distributed IP address management model for efficiently coordinating IP addresses within a clustered system. In an aspect, a subscription level determination component 202 can be utilized to periodically verify a subscription level/status of the node 104. For example, based on the number of IP addresses currently owned by the node 104, the node 104 can be determined to be oversubscribed (e.g., the number of IP addresses currently owned is greater than a determined value), at-subscription (e.g., the number of IP addresses currently owned is equal to the determined value), or undersubscribed (e.g., the number of IP addresses currently owned is less than the determined value).

According to an embodiment, the subscription level determination component 202 can evaluate the value (e.g., maximum number of IP addresses allowed to be owned) based on parameters, such as, but not limited to, a number of serviceable hosts within the cluster and a total number of IP addresses to be requested by those hosts. Typically, a host (e.g., node $104_1$-$104_N$) is determined to be serviceable when it is fully capable of servicing traffic destined for an IP address. Serviceability of a host can be determined based on factors comprising, but not limited to: system group status (e.g., host has quorum with the system); host interface status (e.g., host is able to serve traffic); host service status (e.g., service program(s) are active); etc. Hosts that are participating in distributed IP management can request for IP addresses only if they are serviceable.

In one example, the maximum number of allowed IP addresses per host (maxAllowed) can be determined as:

$$\text{maxAllowed} = \text{ceiling}(\text{count}(\text{IpAddresses})/\max(\text{count}(\text{serviceableHosts}))) \quad (1)$$

Moreover, the maximum number of allowed IP addresses per host can be calculated by dividing the total IP address count (e.g., assigned to a cluster) by the number of serviceable hosts (e.g., minimum 1) and finally rounded up to ensure all IP addresses are accounted for. As the number of serviceable hosts change (e.g., a node gets added to the cluster, a node fails, etc.) the maximum number of allowed IP addresses per host can be updated and accordingly, the subscription level of the node can change.

Based on the current subscription level, an IP address determination component 204 can request for additional IP addresses. For example, the IP address determination component 204 can request for additional IP addresses only if the node 104 is determined to be under-subscribed and/or at-subscription. Typically, the additional IP addresses that are to be requested can be determined based on data stored within the clustered configuration data store 110. According to an aspect, to claim ownership of the one or more IP addresses, the IP address determination component 204 can request the distributed resource coordination component 114 for exclusive access to an identifier arbitrarily bound to the dynamic IP address(es). For example, the IP address determination component 204 can request ownership of the identifier "foo", deterministically created by the IP address determination component 204. Taking ownership of a resource maps to requesting for an exclusive lock on a file. The lock request can be asynchronous, allowing for easy cancellation. The distributed resource coordination component 114 can grant the request or can respond with a request pending notification (e.g., wherein the request can be granted at a later time). In one example, the distributed resource coordination component 114 can be distributed across multiple host nodes of the cluster which facilitates coordination over a backend network. Once granted, the IP address determination component 204 can then claim ownership of the IP address to the network with an ARP request, followed by setting up an internal ownership state. In one aspect, the distributed resource coordination component 114 can grant access to nodes based on their subscription level (e.g., grant access only to undersubscribed nodes, grant access to undersubscribed nodes and/or at-subscription nodes, deny access to oversubscribed nodes, etc.).

Figure 3:
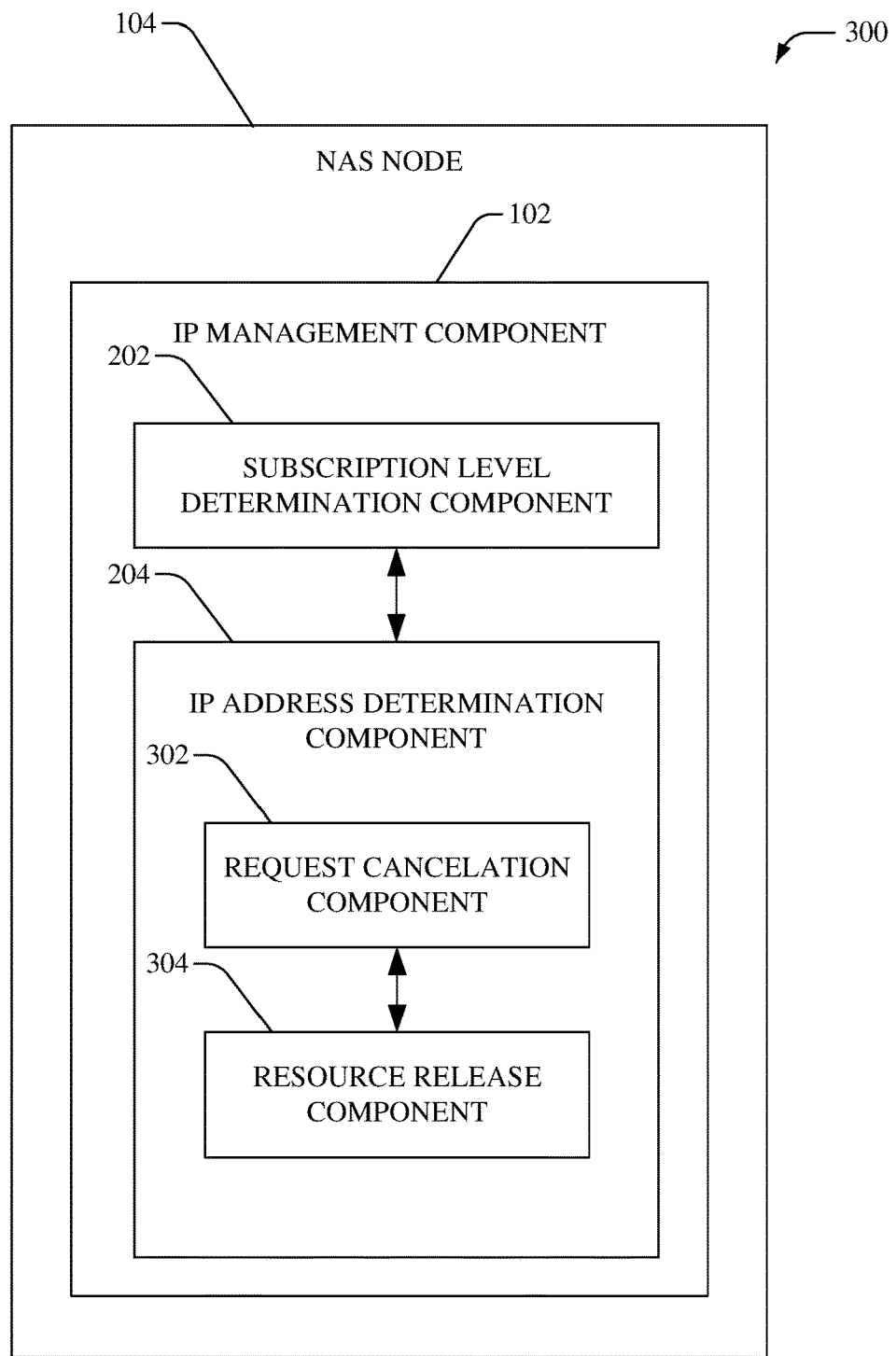
FIG. 3 illustrates an example system that employs a retroactive policy to handle nodes that are determined to be oversubscribed.

FIG. 3 illustrates an example system 300 that employs a retroactive policy to handle nodes that are determined to be oversubscribed, according to one or more aspects of the disclosed subject matter. It is noted that the IP management component 102, NAS node 104, subscription level determination component 202, and IP address determination component 204 can comprise functionality as more fully described herein, for example, as described above with regard to systems 100-200.

In one aspect, the subscription level determination component 202 can monitor (e.g., periodically, at a specified time, during a specified interval, in response to an event, on-demand, etc.) a subscription level of node 104. If the subscription level determination component 202 determines that the node 104 is undersubscribed or at-subscription, the IP address determination component 204 can continue to request IP addresses. Typically, when another host relinquishes ownership of a requested IP address, the undersubscribed node can gain ownership of the IP address. In one aspect, when the node is at-subscription, outstanding IP requests can be maintained to allow immediate reclamation of a failed host's IP addresses.

However, if the subscription level determination component 202 determines that the node 104 is oversubscribed, a request cancellation component 302 can be utilized to cancel all outstanding IP address requests, for example, until the subscription level is determined to be optimal (e.g., node 104 is determined to be at-subscription an/or under subscribed). Further, if the subscription level determination component 202 determines that the node 104 is oversubscribed, a resource release component 304 can be utilized to facilitate a controlled release of IP addresses until the subscription level is determined to be optimal (e.g., node 104 is determined to be at-subscription). For example, the resource release component 304 can perform a step-down release, by releasing IP addresses one at a time (e.g., release one IP address every two minutes), until node 104 is at-subscription level. This can prevent flapping of IP addresses across multiple hosts, which can bully each other when multiple resources move and no more than one IP address is unreachable during a step-down. Once the previously oversubscribed node 104 is at or below the subscription threshold, the IP address determination component 204 can request all relevant IP addresses again.

Figure 4:
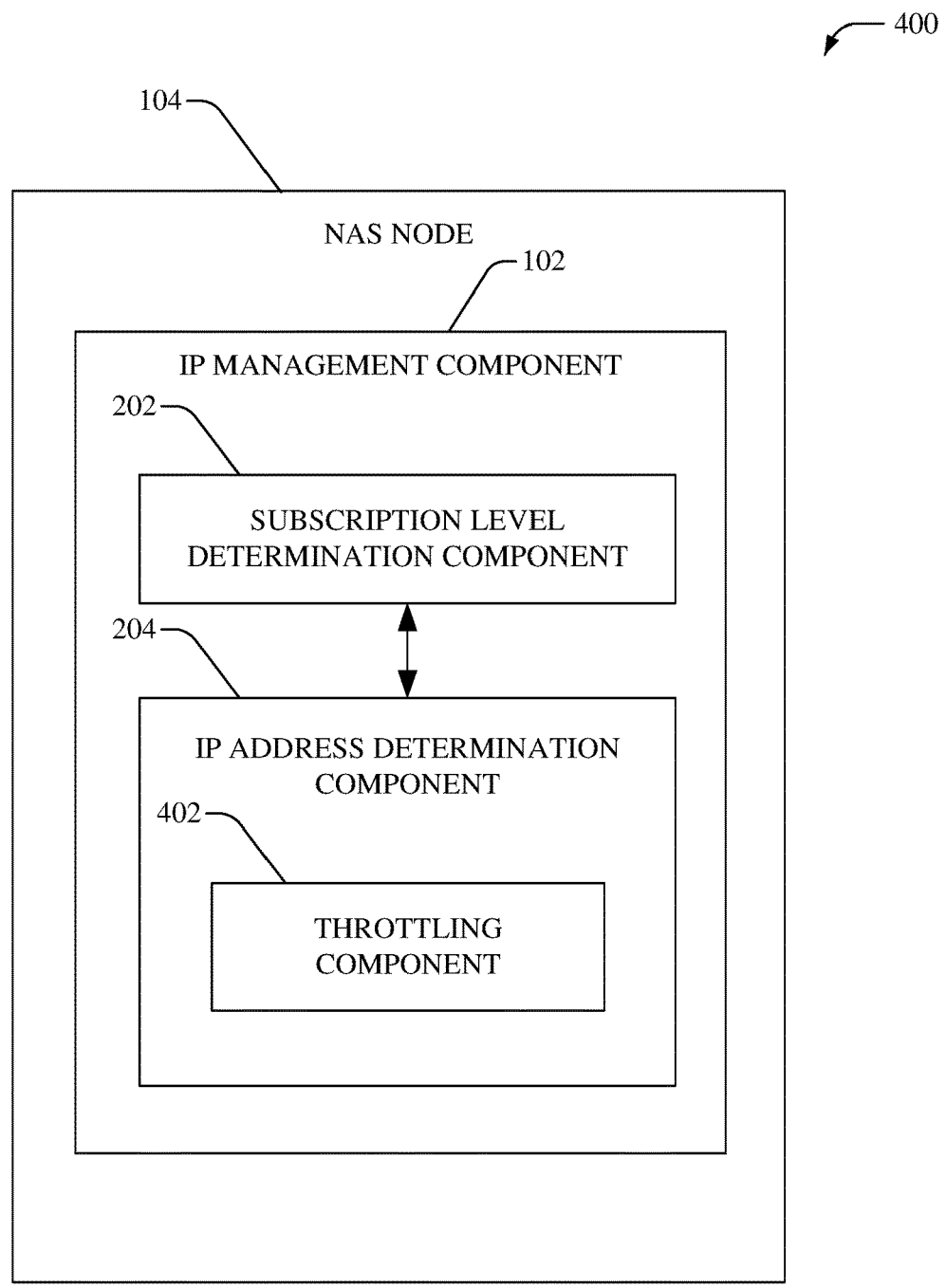
FIG. 4 illustrates an example system that employs a proactive policy to handle nodes that are determined to be oversubscribed.

Referring now to FIG. 4, there illustrated is an example system 400 that employs a proactive policy to handle nodes that are determined to be oversubscribed, according to one or more aspects of the disclosed subject matter. It is noted that the IP management component 102, NAS node 104, subscription level determination component 202, and IP address determination component 204 can comprise functionality as more fully described herein, for example, as described above with regard to systems 100-200.

As described above, the subscription level determination component 202 can monitor (e.g., periodically, at a specified time, during a specified interval, in response to an event, on-demand, etc.) a subscription level of Node 104 and if determined that the Node 104 is under-subscribed or at-subscription, the IP address determination component 204 can continue to request IP addresses. However, if the subscription level determination component 202 determines that the Node 104 is oversubscribed, a throttling component 402 can be utilized to throttle the requesting of new IP addresses through the IP address determination component 204 to prevent ownership of additional IP addresses when Node 104 is oversubscribed. Only when the host is oversubscribed will this policy apply, and therefore a proactive policy is possible if the retroactive policy is already in effect.

Figure 5B:
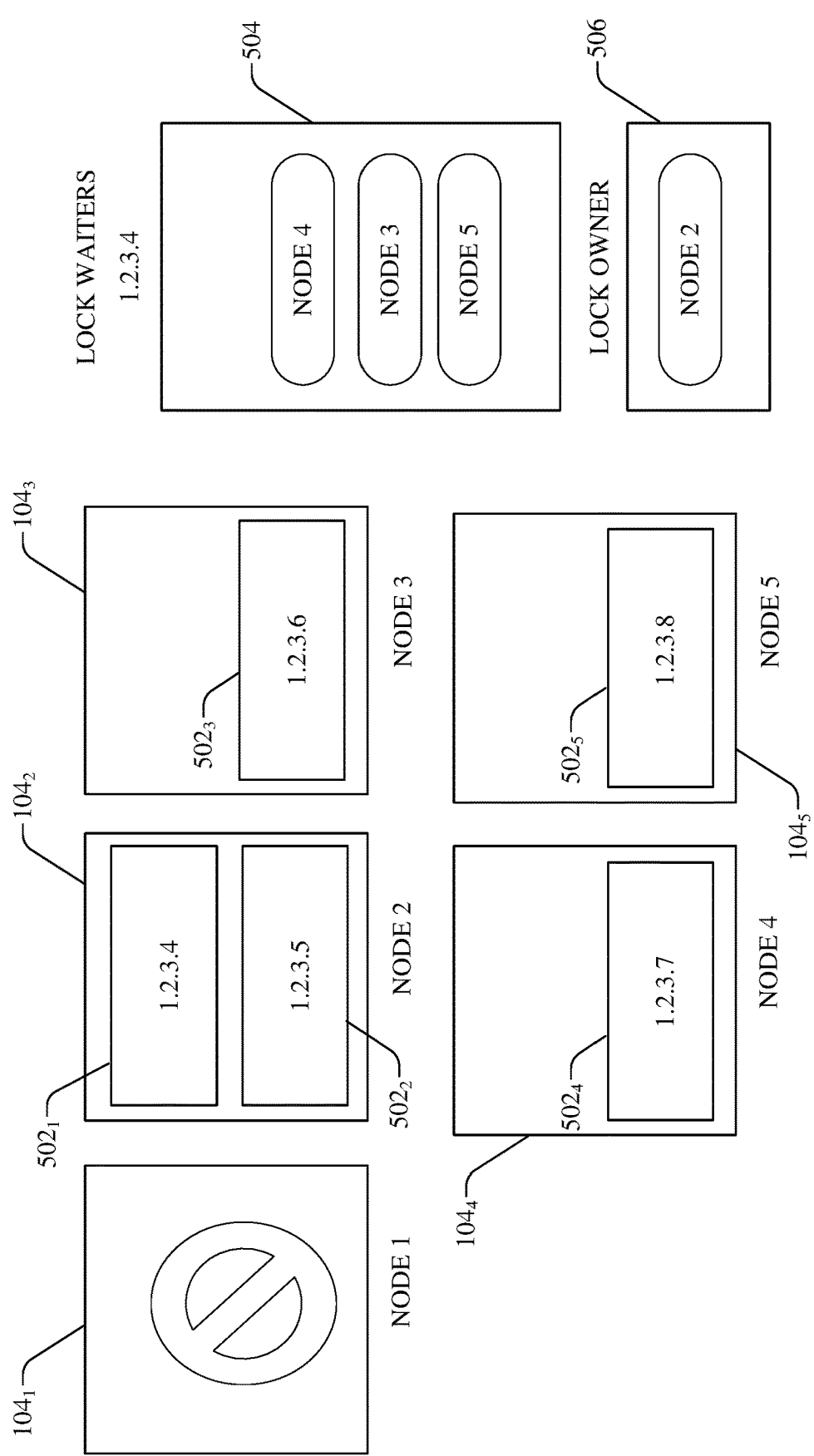

FIGS. 5A-5F illustrate example systems 500-550 that illustrate balanced IP address redistribution based on a retroactive policy, according to an aspect of the subject disclosure. Although five nodes $104_1$-$104_5$ and a pool of five IP addresses $502_1$-$502_5$ are depicted it is noted that the cluster can have fewer or greater number of nodes with fewer or greater number of IP addresses dedicated to the cluster. According to an embodiment, dynamic IP address ownership is determined on a first-come, first-serve basis. Moreover, IP address ownership can be coordinated through a lock coordinator (e.g., distributed resource coordination component 114) on a per-node basis via a communication channel that is independent of the IP network being assigned. As an example, data representing nodes that request exclusive access to an IP address (e.g., address 1.2.3.4) can be stored within a queue 504 in the order that the requests have been received. The lock coordinator can grant exclusive access to the nodes on a first come first basis. FIG. 5A illustrates a lock owner 506 that indicates that Node 1 has been granted exclusive access to IP address 1.2.3.4.

Figure 5C:
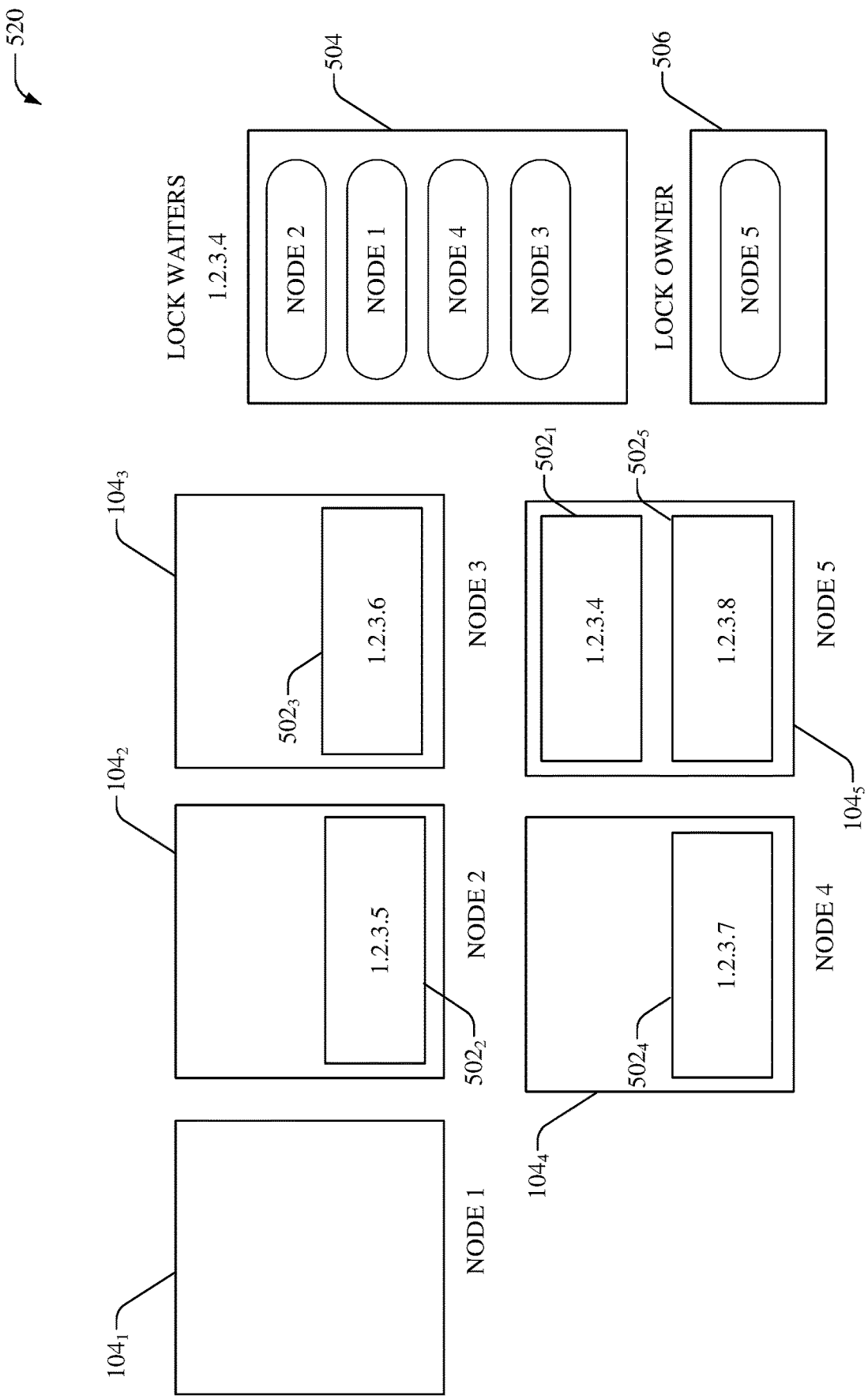

FIG. 5B illustrates an example embodiment wherein Node 1 is not serviceable (e.g., node has failed, is offline, etc.). In this example scenario, IP address 1.2.3.4 is now available and exclusive access to it can be provided to the next requestor in the queue 504, i.e., Node 2 (as depicted at 506). The nodes determine a maximum number of IP addresses that they are allowed to own, for example, based on equation (1). In this example scenario, each node can be considered at-subscription if it owns two IP addresses. However, as shown at FIG. 5C, if Node 1 ($104_1$) is reactivated and serviceable, the maximum number of IP addresses that each node is allowed to own, changes back to 1. Accordingly, Node 2 ($104_2$) can release the IP address resource for 1.2.3.4, which can be granted to the next requestor in the queue 504. As an example, once reactivated, Node 1 ($104_1$) can request for exclusive access to own the IP address 1.2.3.4 and the request can be stored in 504 in a first-come first-serve manner.

Figure 5D:
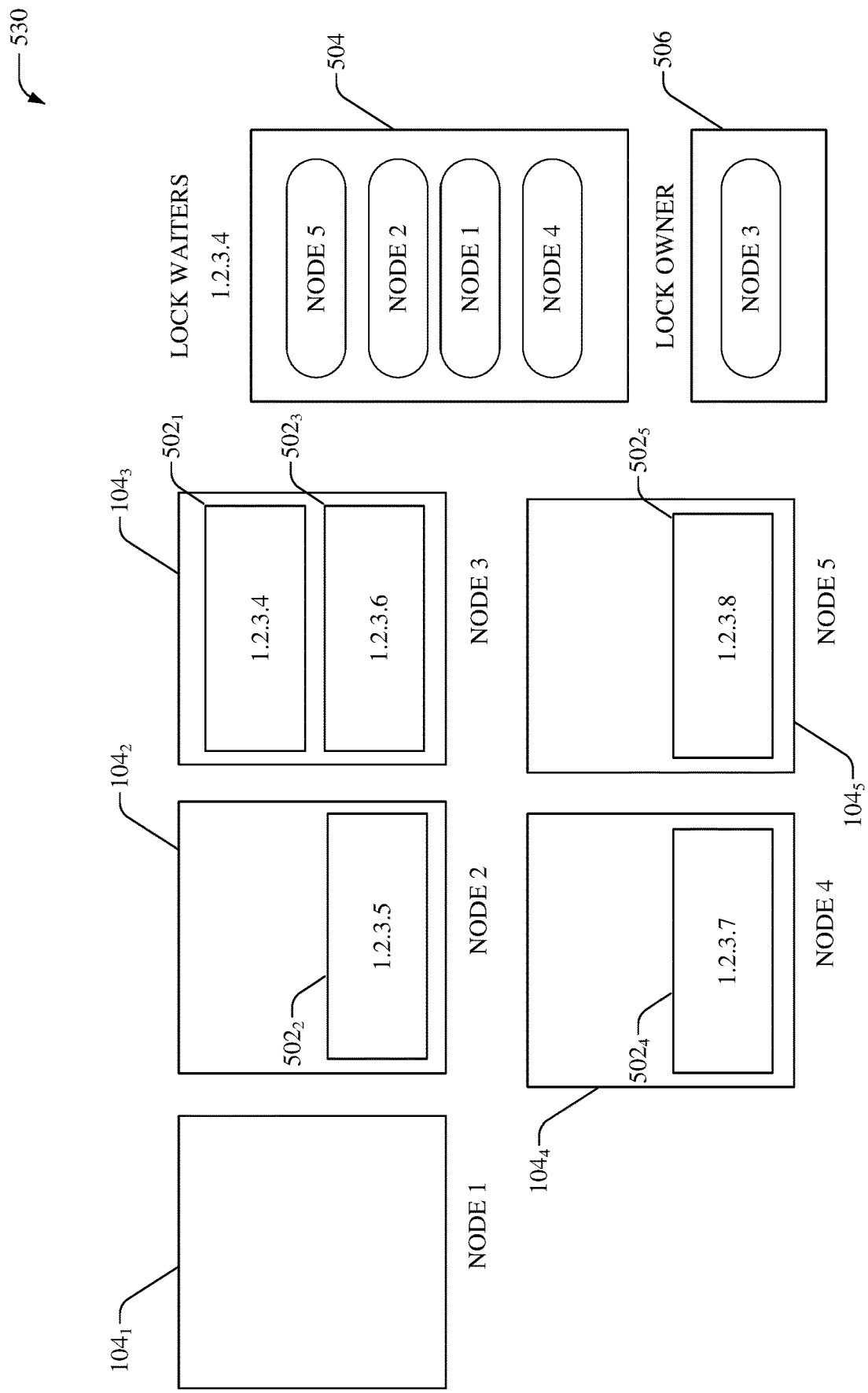
Figure 5E:
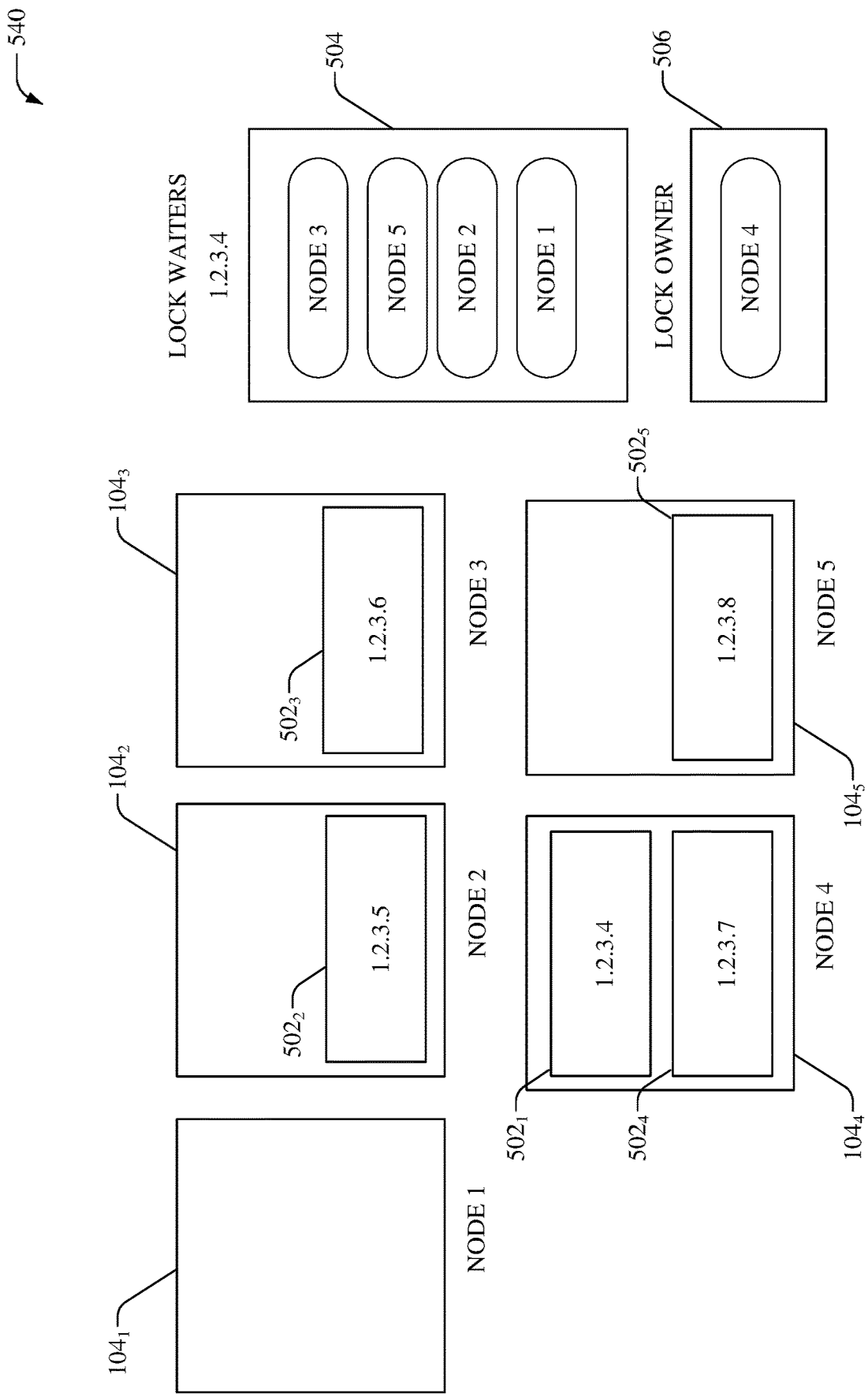
Figure 5F:
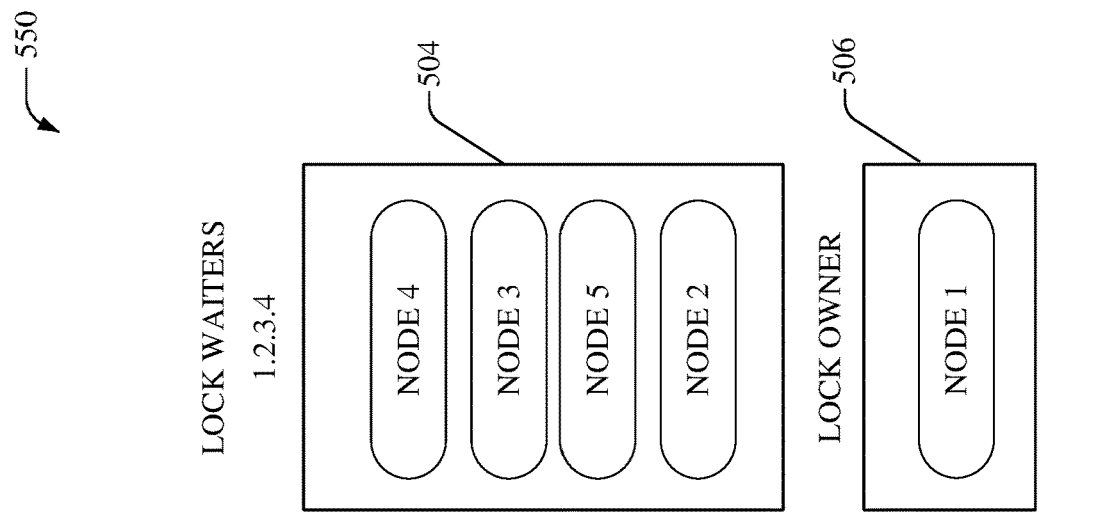
Figure 5F:
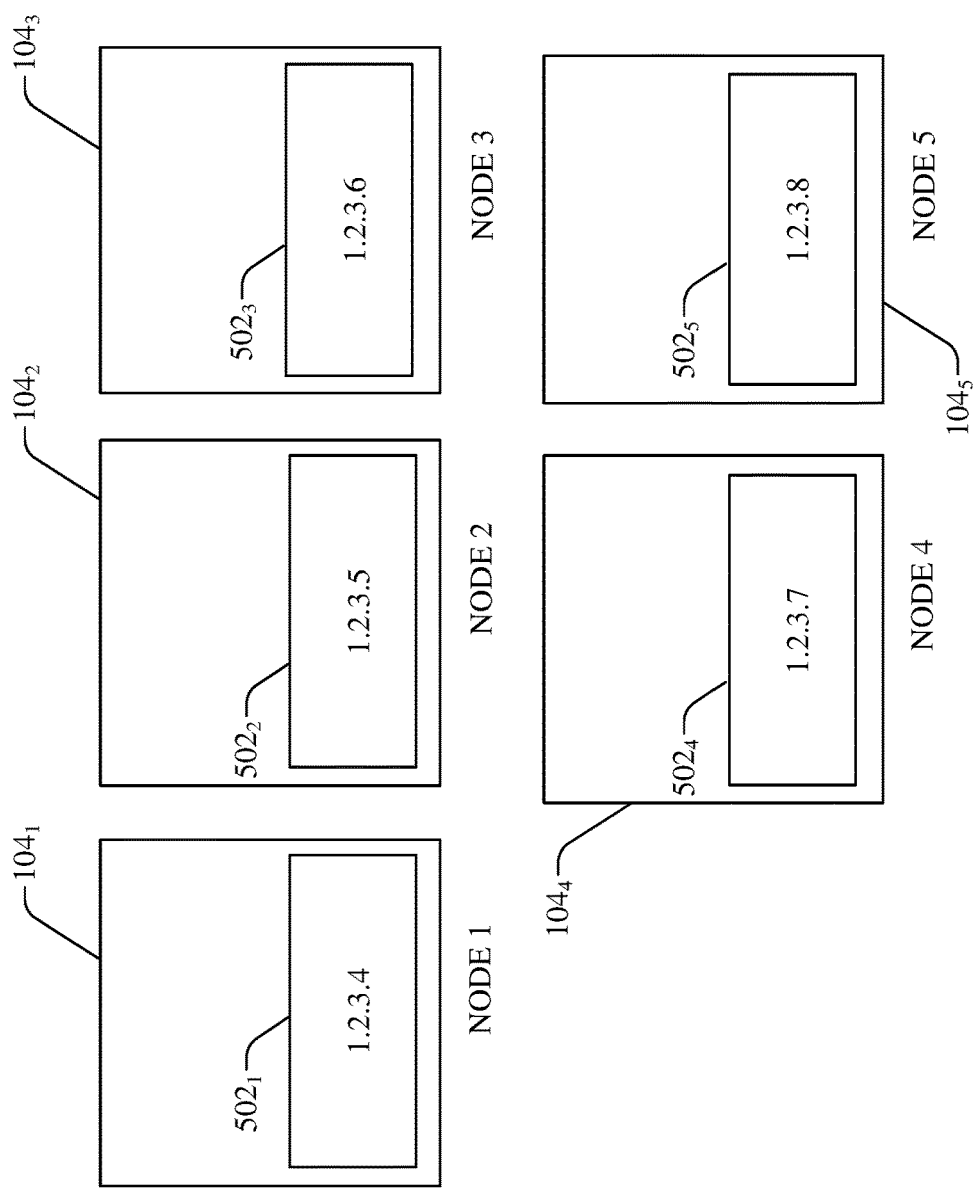

As shown at FIGS. 5C-5E, even though Node 5, Node 3, and Node 4 have requested for access, based on equation (1), the nodes would be oversubscribed if they claim ownership for 1.2.3.4 and accordingly, the IP address resource for 1.2.3.4. is released. Further, FIG. 5F depicts that exclusive access to the IP address 1.2.3.4 can be granted to Node 1 ($104_1$), which can then claim ownership (e.g., since it is not oversubscribed). Accordingly, the IP addresses can be balanced across the cluster.

Figure 6B:
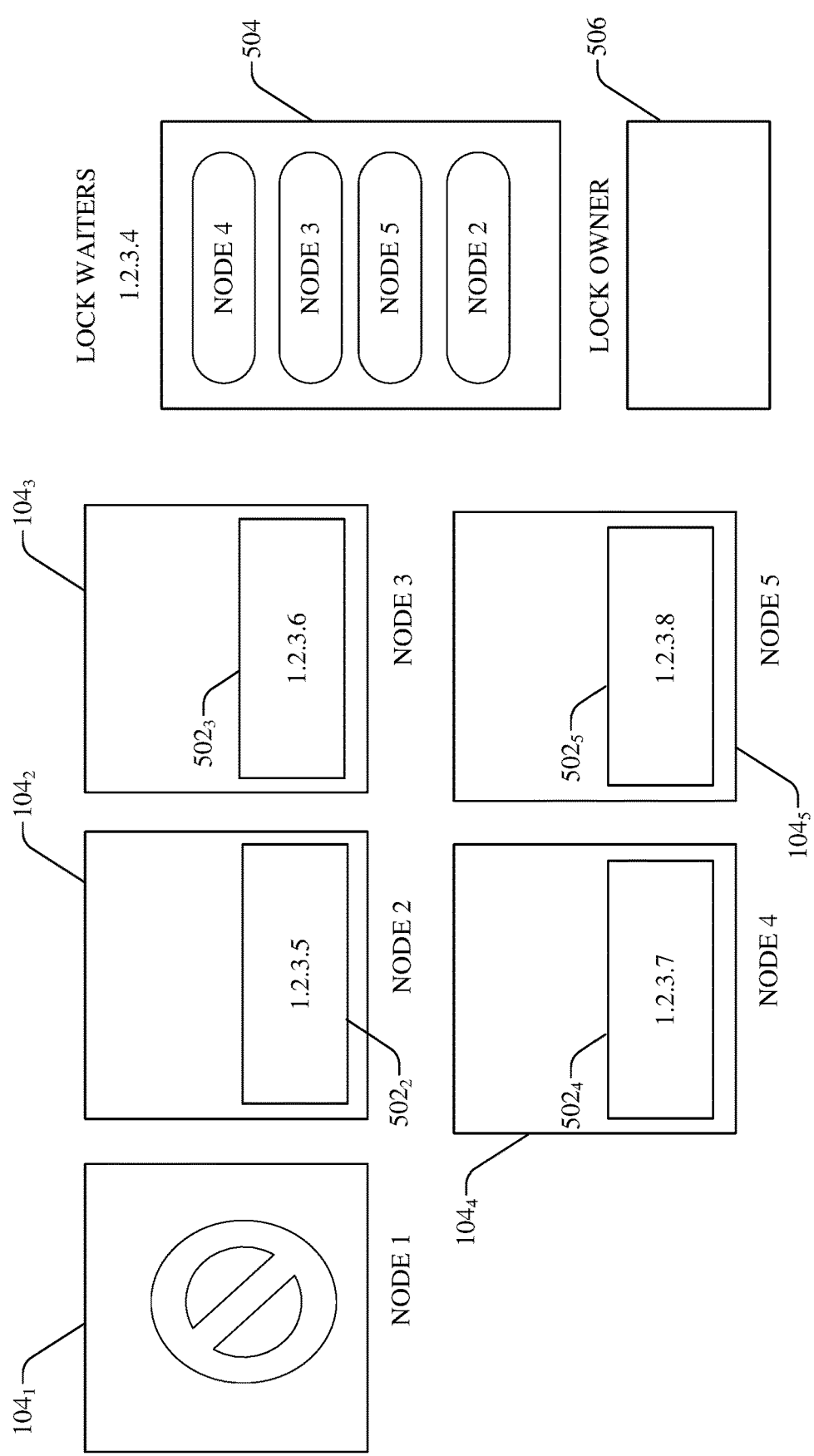

FIGS. 6A-6E illustrate example systems 600-640 that illustrate balanced IP address redistribution based on a proactive policy, according to an aspect of the subject disclosure. Although five nodes $104_1$-$104_5$ and a pool of five IP addresses $502_1$-$502_5$ are depicted it is noted that the cluster can have fewer or greater number of nodes with fewer or greater number of IP addresses dedicated to the cluster. According to an embodiment, dynamic IP address ownership is determined on a first-come, first-serve basis. Moreover, IP address ownership can be coordinated through a lock coordinator (e.g., distributed resource coordination component 114) on a per-node basis via a communication channel that is independent of the IP network being assigned. As an example, data representing nodes that request exclusive access to an IP address (e.g., address 1.2.3.4) can be stored within a queue 504 in the order that the requests have been received. The lock coordinator can grant exclusive access to the nodes on a first come first basis. FIG. 6A illustrates a lock owner 506 that indicates that Node 1 has been granted exclusive access to IP address 1.2.3.4. Since the nodes $104_1$-$104_5$ are determined to be at-subscription (based on equation (1)), they are not waiting on additional IP addresses and accordingly, the queue 504 is empty.

Figure 6C:
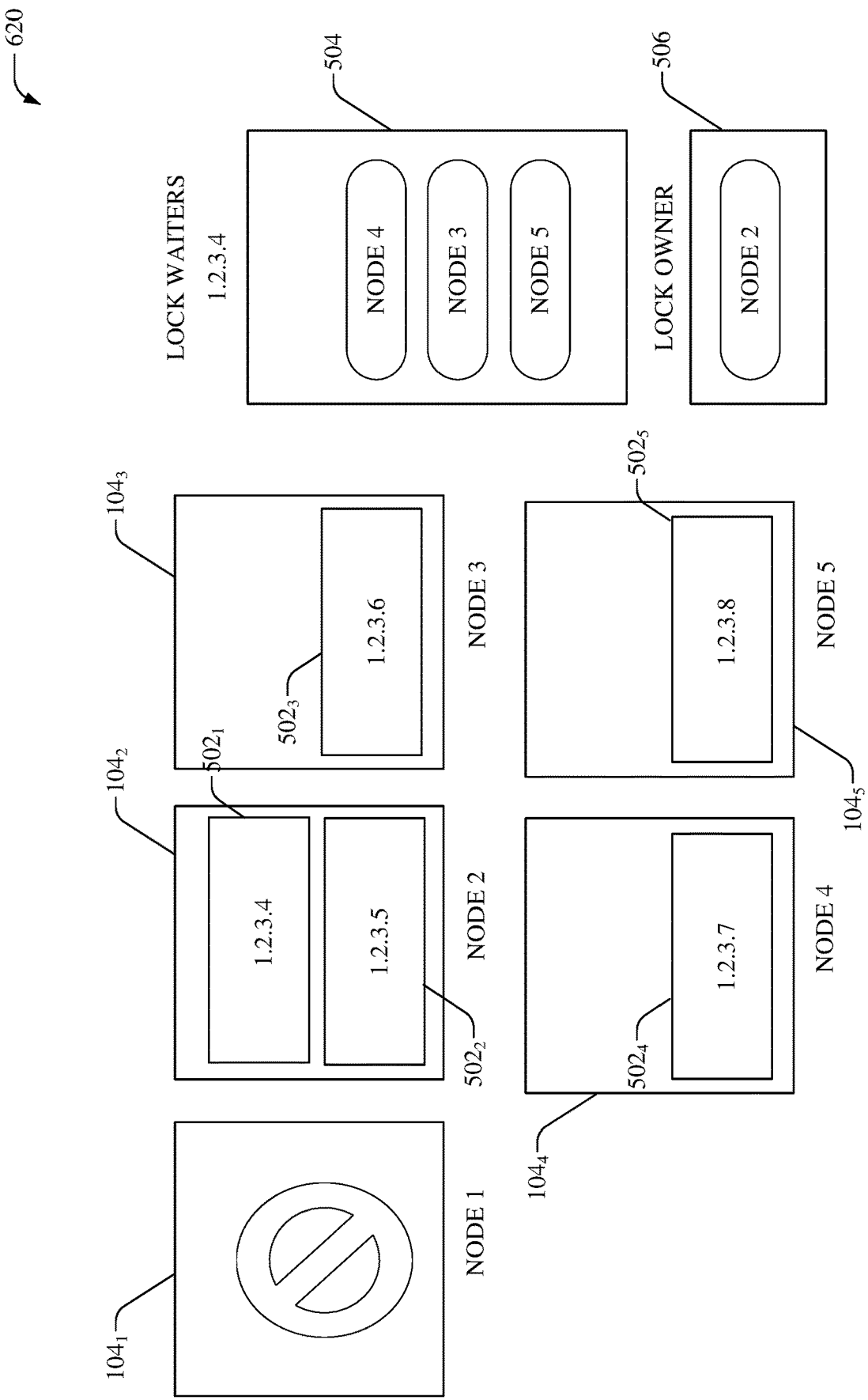

FIG. 6B illustrates an example embodiment wherein Node 1 is not serviceable (e.g., node has failed, is offline, etc.). In this example scenario, nodes $104_2$-$104_5$ are now determined to be undersubscribed (based on equation (1)) and accordingly request for access to an additional IP address (e.g., address 1.2.3.4). FIG. 6C illustrates an example embodiment wherein exclusive access to the available IP address 1.2.3.4 is provided to the first requestor in the queue 504, i.e., Node 2 (as depicted at 506). The nodes determine a maximum number of IP addresses that they are allowed to own, for example, based on equation (1). In this example scenario, each node can be considered at-subscription if it owns two IP addresses.

Figure 6D:
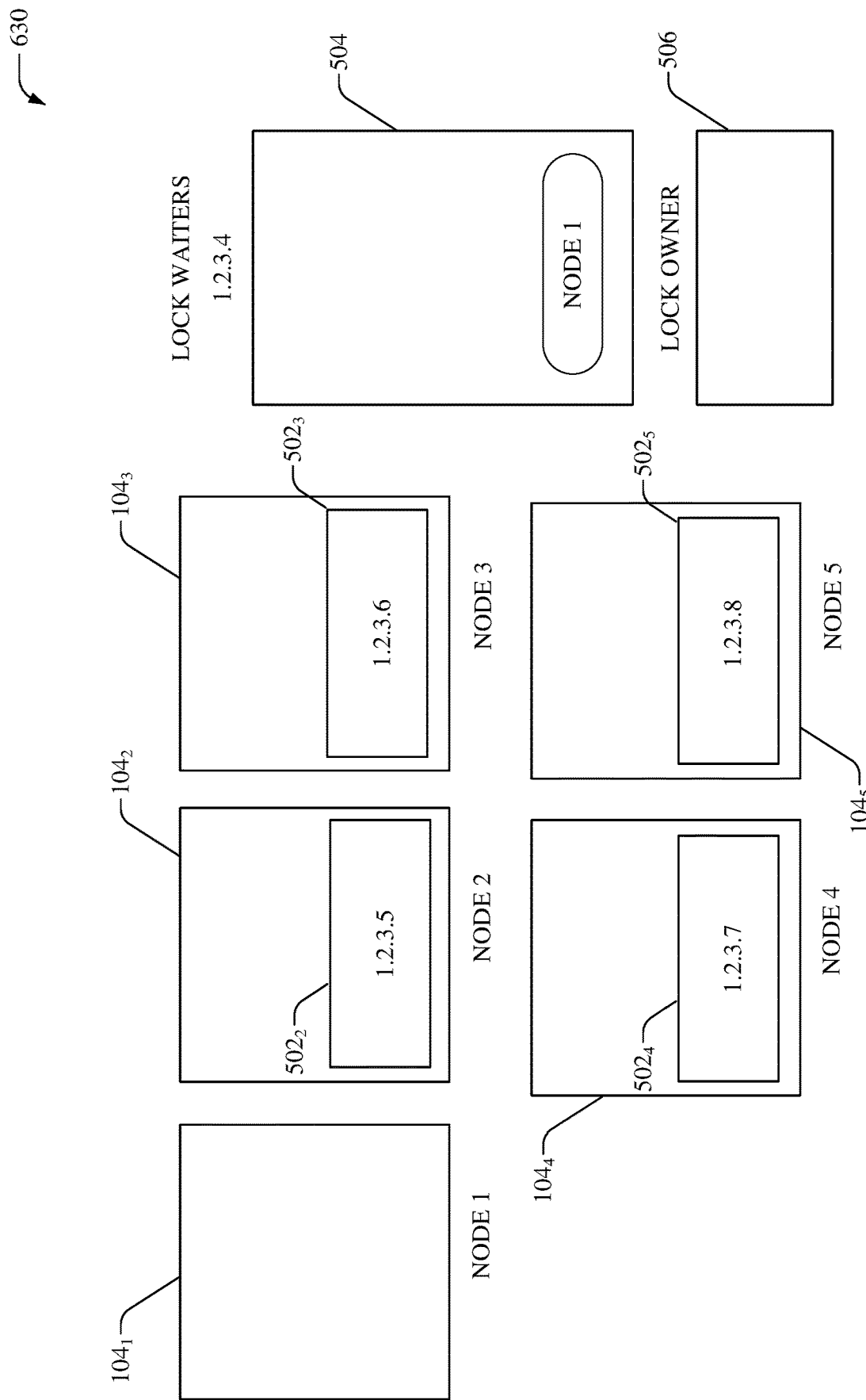

FIG. 6D illustrates an example embodiment wherein Node 1 ($104_1$) is reactivated and serviceable. In this example embodiment, the maximum number of IP addresses that each node is allowed to own, changes back to 1. Accordingly, Node 2 ($104_2$) can release the IP address resource for 1.2.3.4 since it is determined to be oversubscribed. Further, Nodes 3-5 ($104_3$-$104_5$) that are determined to be at-subscription, can proactively cancel requests for additional IP addresses (e.g., request data associated with Nodes 3-5 ($104_3$-$104_5$) is removed from queue 504).

Figure 6E:
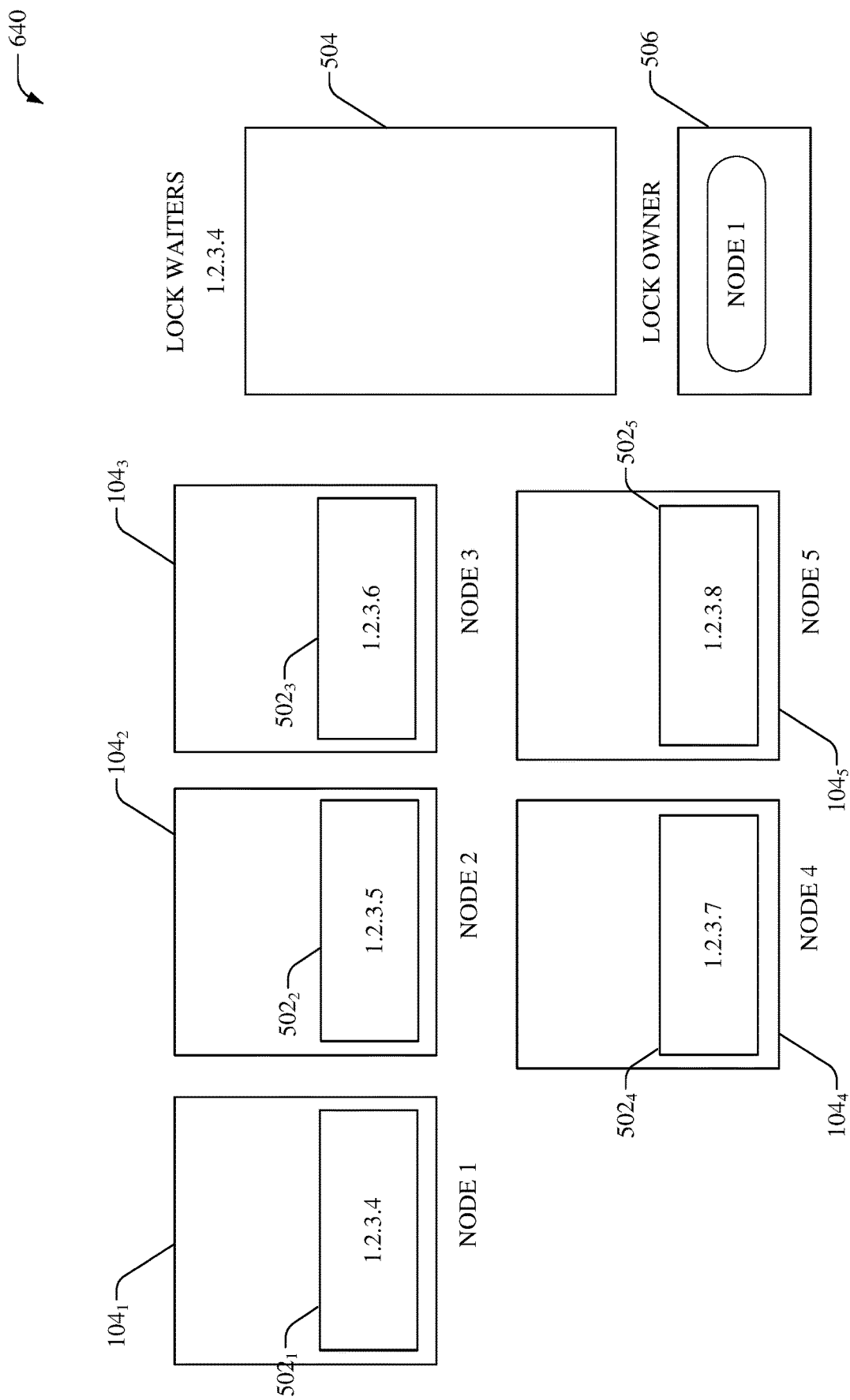

As an example, once reactivated, Node 1 ($104_1$) can request for exclusive access to own the IP address 1.2.3.4 and the request can be stored in 504 in a first-come first-serve manner. Accordingly, FIG. 6E depicts that exclusive access to the IP address 1.2.3.4 can be granted to Node 1 ($104_1$), since there are no other lock waiters. Node 1 ($104_1$) can then claim ownership (e.g., since it is not oversubscribed) for IP address 1.2.3.4. Accordingly, the IP addresses can be balanced across the cluster.

Figure 7:
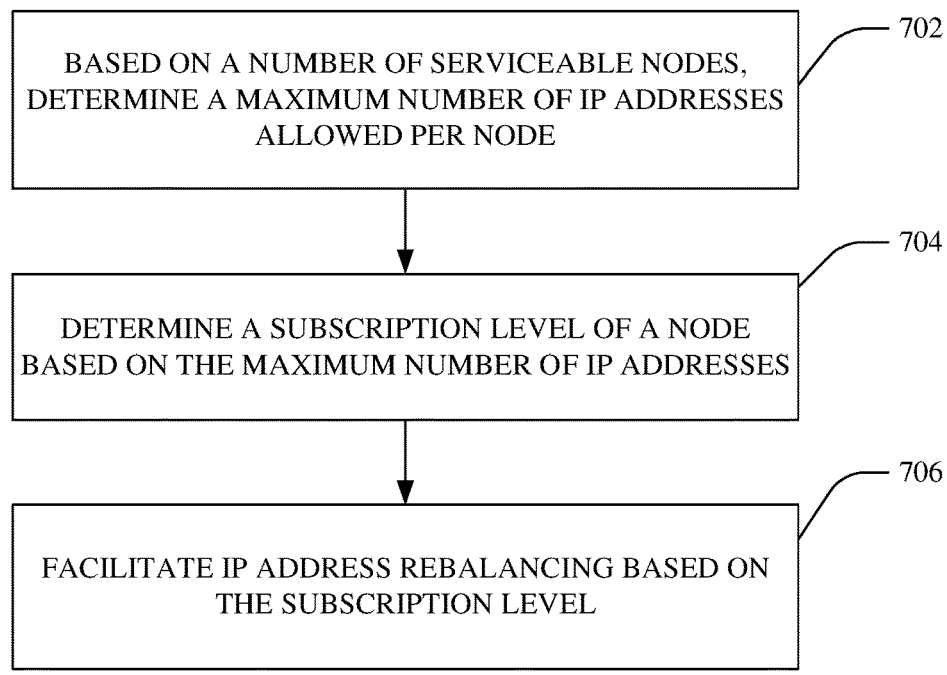
FIG. 7 illustrates an example method that facilitates IP address rebalancing in a coordinated system.
Figure 8:
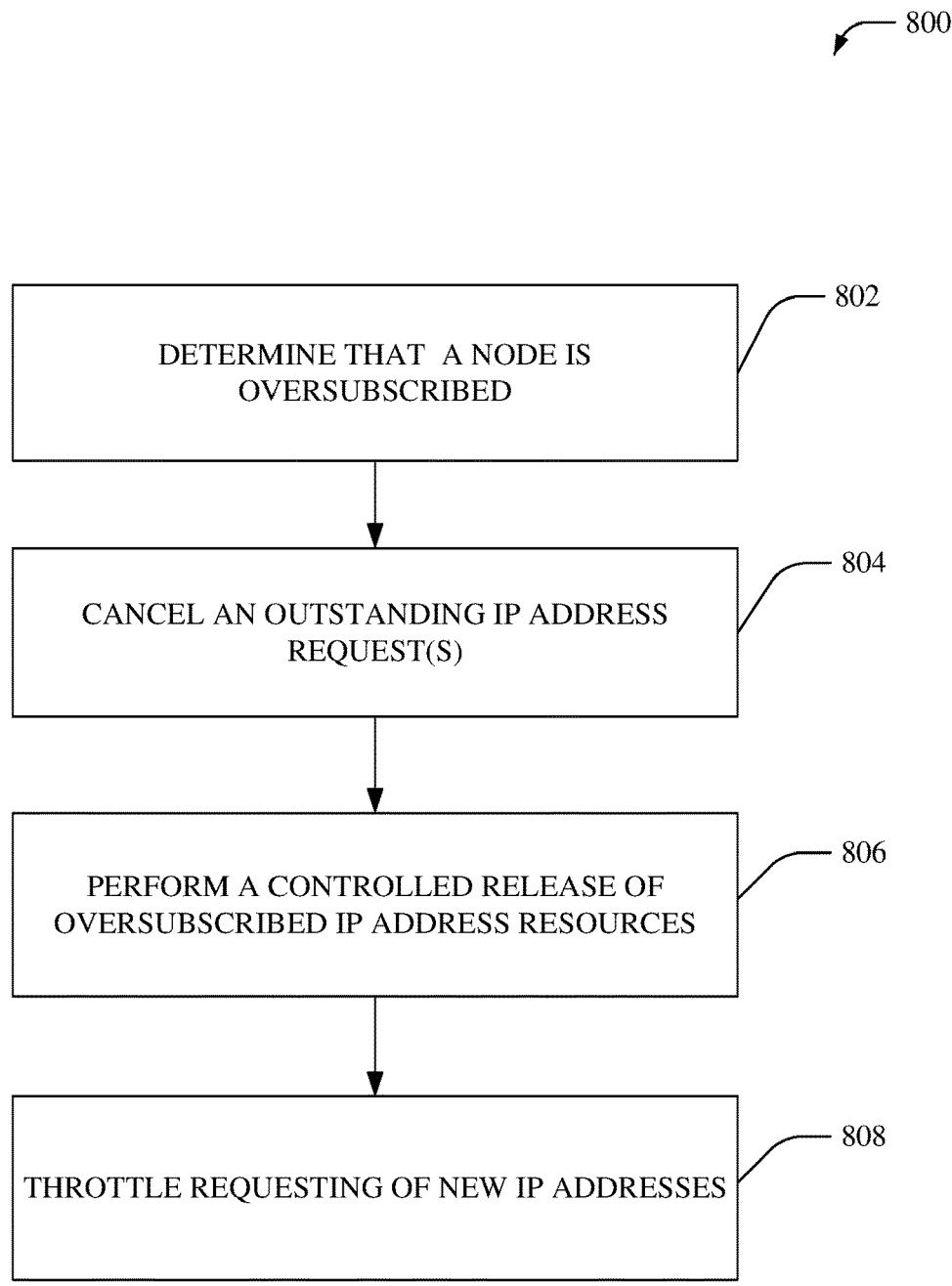
FIG. 8 illustrates an example method that facilitates a balanced redistribution of IP addresses.

FIGS. 7-8 illustrate flow diagrams and/or methods in accordance with the disclosed subject matter. For simplicity of explanation, the flow diagrams and/or methods are depicted and described as a series of acts. It is to be understood and appreciated that the various embodiments are not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Referring now to FIG. 7, there illustrated is an example method 700 that facilitates IP address rebalancing in a coordinated system, according to an aspect of the subject disclosure. In one aspect, method 700 can be implemented by one (or more) of NAS nodes of a cluster. At 702, a maximum number of IP addresses allowed to be claimed by a node can be determined, for example, based on a number of serviceable nodes within a cluster. As an example, the determination can be performed periodically and/or in response to an event (e.g., change in the number of serviceable nodes). In one aspect, the maximum number of allowed IP addresses per host can be calculated by dividing the total IP Addresses count (e.g., assigned to a cluster) by the number of serviceable hosts (e.g., minimum 1) and finally rounded up to ensure all IP addresses are accounted for.

At 704, a subscription level (e.g., undersubscribed, at-subscription, or oversubscribed) of a node can be determined based on the maximum number of IP addresses. Further, at 706, IP address rebalancing can be facilitated based on the subscription level. For example, oversubscribed nodes can release IP address resources until they reach an at-subscription (or undersubscribed) level.

FIG. 8 illustrates an example method 800 that facilitates a balanced redistribution of IP addresses, according to an aspect of the subject disclosure. According to an aspect, method 800 can be implemented by NAS nodes that implement distributed IP address management. At 802, it can be determined that a node is oversubscribed. For example, it can be determined that the node has claimed more than a maximum number of IP addresses allowed per node. At 804, in response to determining that the node is oversubscribed, outstanding IP address requests can be canceled. Further, at 806 a controlled release of oversubscribed IP address resources can be performed (e.g., release one IP address resource every X minutes). Furthermore, at 808, the requesting of new/additional IP addresses by a node can be throttled.

Figure 9:
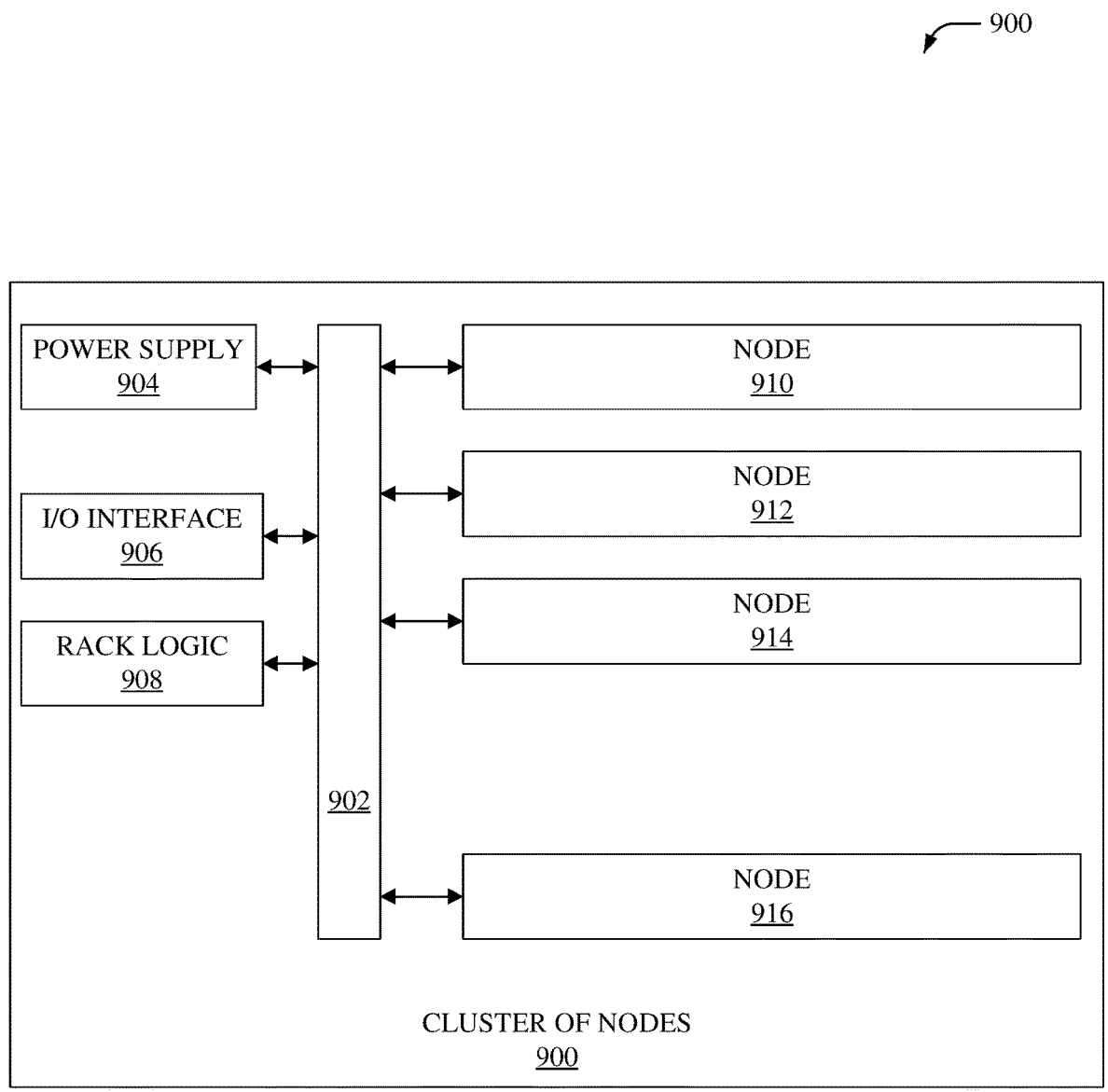
FIG. 9 illustrates an example block diagram of rack of servers in accordance with implementations of this disclosure.

FIG. 9 illustrates an example block diagram of a cluster of nodes in accordance with implementations of this disclosure. However, the components shown are sufficient to disclose an illustrative implementation. Generally, a node is a computing device with a modular design optimized to minimize the use of physical space and energy. A node can comprise processors, power blocks, cooling apparatus, network interfaces, input/output interfaces, etc. Although not shown, cluster of nodes typically comprises several computers that require a network connection and a power cord connection to operate. Each node computer often comprises redundant components for power and interfaces. The cluster of nodes 900 as depicted shows Nodes 910, 912, 914, and 916 operating in a cluster; however, it can be appreciated that more or less nodes can make up a cluster. The nodes, NAS node 104 and/or NAS nodes $104_1$-$104_N$ described herein can be substantially similar to Nodes 910, 912, 914, and 916 and can comprise functionality as more fully described herein, for example, as described with regard to the Nodes 910, 912, 914, and 916. Nodes can refer to a physical enclosure with a varying amount of CPU cores, random access memory, flash drive storage, magnetic drive storage, etc. For example, a single node can comprise, in one example, 36 disk drive bays with attached disk storage in each bay. It can be appreciated that nodes within the cluster of nodes can have varying configurations and need not be uniform. It can be further appreciated that nodes among the cluster of nodes do not have to be in a same enclosure as shown for ease of explanation in FIG. 9 and can be geographically disparate. Backplane 902 (e.g., backend network 109) can be any type of commercially available networking infrastructure that allows nodes among the cluster of nodes to communicate with each other in as close to real time as the networking infrastructure allows. It can be appreciated that the backplane 902 can also have a separate power supply, logic, I/O, etc. as necessary to support communication amongst nodes of the cluster of nodes.

As shown in the figure, enclosure 900 contains at least a power supply 904, an input/output interface 906, rack logic 908, nodes 910, 912, 914, and 916, and backplane 902. Power supply 904 provides power to each component and server within the enclosure. The input/output interface 906 provides internal and external communication for components and servers within the enclosure. Backplane 902 can enable passive and active communication of power, logic, input signals, and output signals for each node.

Figure 10:
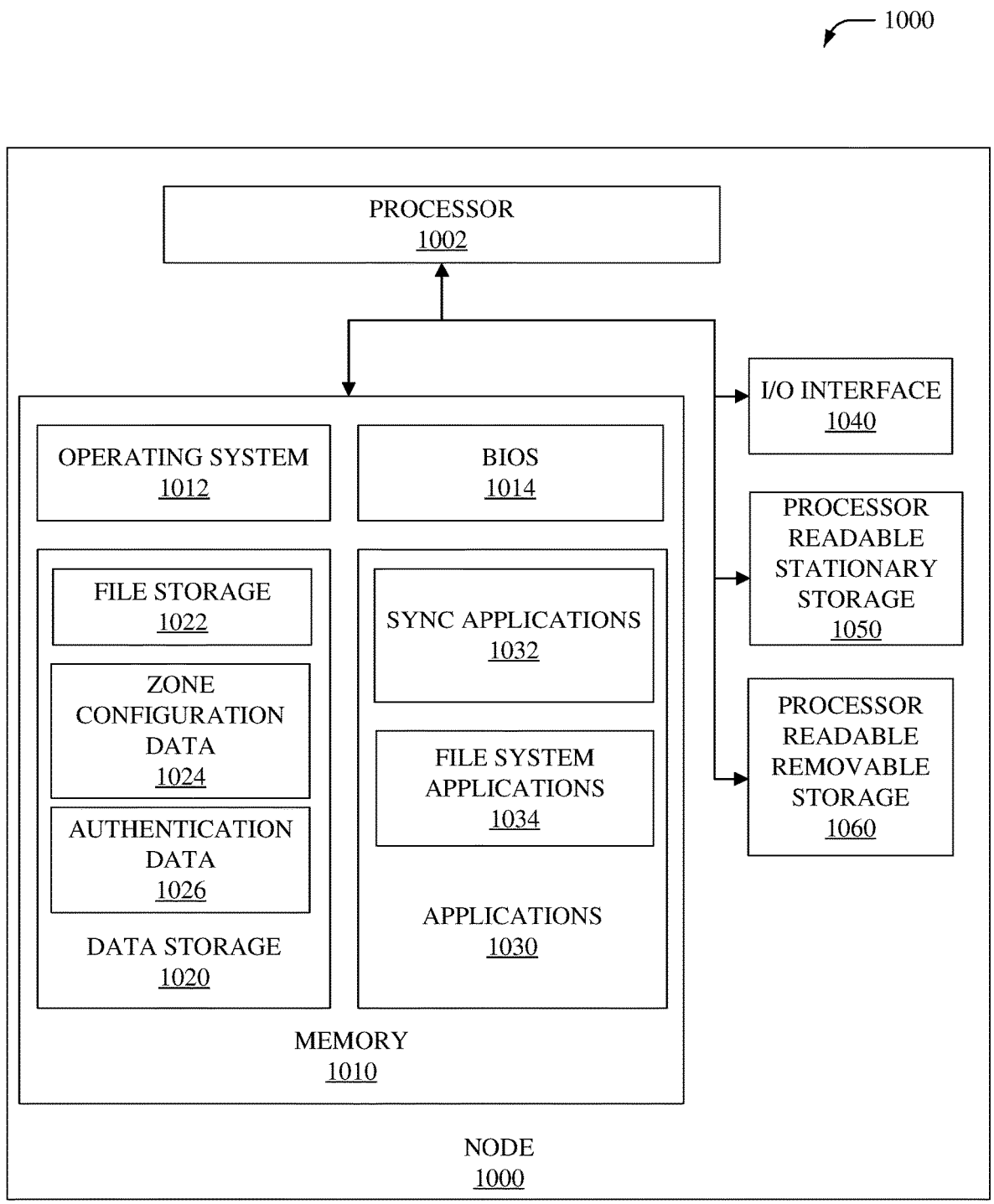
FIG. 10 illustrates an example block diagram of a server in accordance with implementations of this disclosure.

FIG. 10 illustrates an example block diagram of a node 1000 in accordance with implementations of this disclosure. As shown in FIG. 9, a plurality of nodes can be included in one enclosure that shares resources provided by the enclosure to reduce size, power, and cost. NAS node 104, NAS nodes $104_1$-$104_N$, and/or Nodes 910, 912, 914, and 916 disclosed herein can each comprise at least a portion of the node 1000.

In an aspect, the node 1000 comprises a processor 1002 that can communicate with memory 1010 via a bus. Node 1000 can also comprise input/output interface 1040, processor-readable stationary storage device(s) 1050, and processor-readable removable storage device(s) 1060. Input/output interface 1040 can enable node 1000 to communicate with other nodes, mobile devices, network devices, and the like. Processor-readable stationary storage device 1050 can comprise one or more devices such as an electromagnetic storage device (hard disk), solid state hard disk (SSD), hybrid of both an SSD and a hard disk, and the like. In some configurations, a node can comprise many storage devices. Also, processor-readable removable storage device 1060 enables processor 1002 to read non-transitive storage media for storing and accessing processor-readable instructions, modules, data structures, and other forms of data. The non-transitive storage media can comprise flash drives, tape media, floppy media, disc media, and the like.

Memory 1010 can comprise Random Access Memory (RAM), Read-Only Memory (ROM), hybrid of RAM and ROM, and the like. As shown, memory 1010 comprises operating system 1012 and basic input/output system (BIOS) 1014 for enabling the operation of node 1000. In various embodiments, a general-purpose operating system can be employed such as a version of UNIX, LINUX™, a specialized server operating system such as Microsoft's Windows Server™ and Apple Computer's OS X, or the like.

Applications 1030 can comprise processor executable instructions which, when executed by node 1000, transmit, receive, and/or otherwise process messages, audio, video, and enable communication with other networked computing devices. Examples of application programs comprise database servers, file servers, calendars, transcoders, and so forth. Applications 1030 can comprise, for example, file system application 1034, and sync applications 1032 according to implementations of this disclosure. For example, an application to sync a source cluster and a target cluster can be used by a user or administrator to establish a new access zone sync, associate the access zone with a network interface, associate a snapshot set or subset for syncing, managing sync policies, etc. It can be appreciated that a UI for such application can exists, such as within a web UI for the distributed file system as a whole.

Human interface components (not pictured), can be remotely associated with node 1000, which can enable remote input to and/or output from node 1000. For example, information to a display or from a keyboard can be routed through the input/output interface 1040 to appropriate peripheral human interface components that are remotely located. Examples of peripheral human interface components comprise, but are not limited to, an audio interface, a display, keypad, pointing device, touch interface, and the like.

Data storage 1020 can reside within memory 1010 as well, storing file storage 1022 data such as metadata or Local Interconnect Network (LIN) data. It can be appreciated that LIN data and/or metadata can relate to rile storage within processor readable stationary storage device 1050 and/or processor readable removable storage device 1060. For example, LIN data can be cached in memory 1010 for faster or more efficient frequent access versus being stored within processor readable stationary storage 1050.

The illustrated aspects of the disclosure can be practiced in distributed computing environments where certain tasks are performed by remote processing devices that are linked through a communications network. In a distributed computing environment, program modules can be located in both local and remote memory storage devices.

Figure 11:
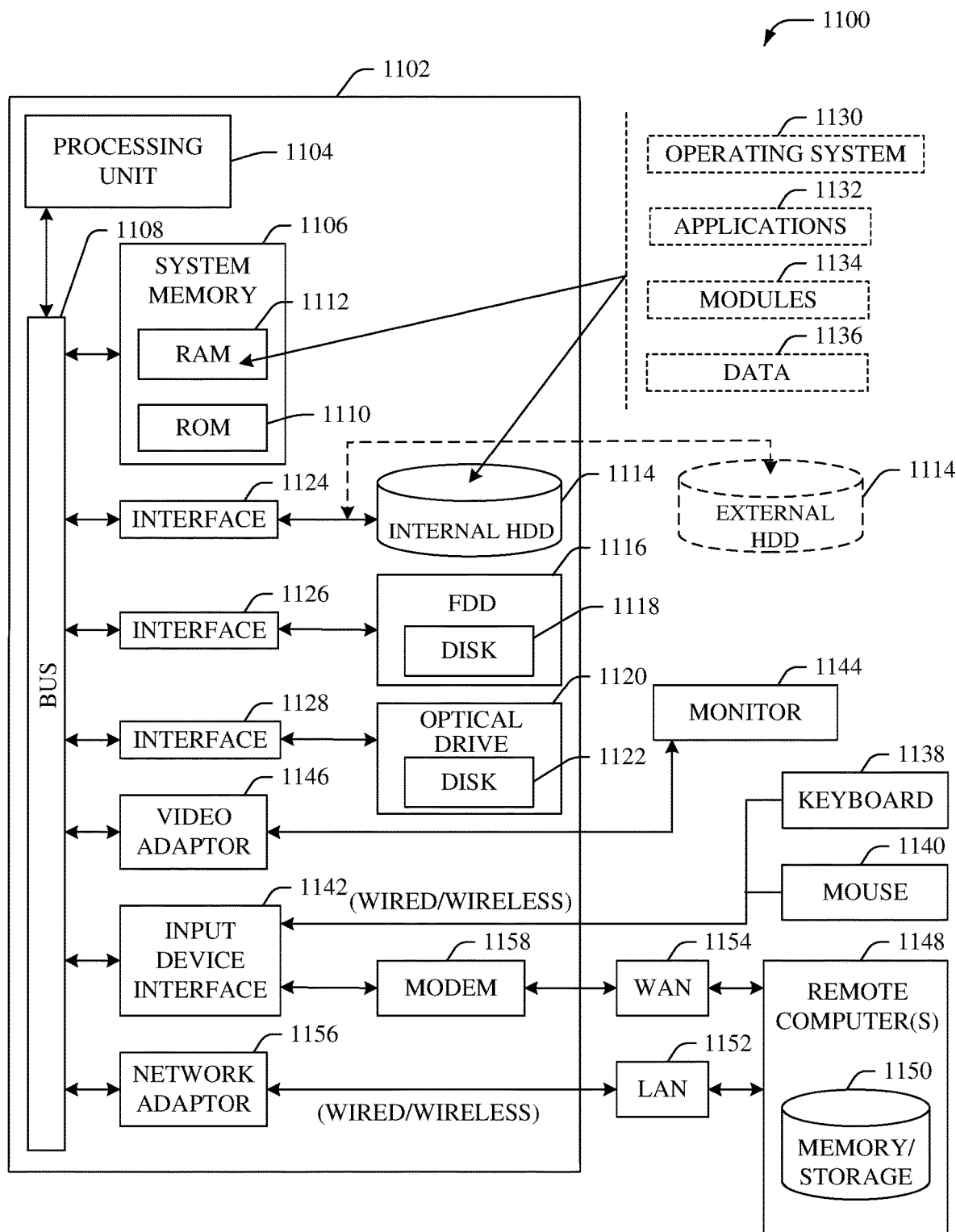
FIG. 11 illustrates a block diagram of an example computer operable to execute the disclosed storage system architecture.

Referring now to FIG. 11, there is illustrated a block diagram of a computer 1102 operable to execute the disclosed file system architecture. In order to provide additional context for various aspects of the disclosed subject matter, FIG. 11 and the following discussion are intended to provide a brief, general description of a suitable computing environment 1100 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules comprise routines, programs, components, data structures, etc., that perform particular tasks or implement particular abstract data types. Moreover, those skilled in the art will appreciate that the various methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices. The illustrated aspects of the specification can also be practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, radio frequency (RF), infrared and other wireless media.

With reference again to FIG. 11, the example environment 1100 for implementing various aspects of the specification comprises a computer 1102, the computer 1102 comprising a processing unit 1104, a system memory 1106 and a system bus 1108. As an example, the component(s), server(s), node(s), cluster(s), system(s), driver(s), module(s), agent(s), and/or device(s) (e.g., IP management components $102_1$-$102_N$, IP management component 102, NAS nodes $104_1$-$104_N$, NAS node 104, clustered system 106, backend network 108, clustered configuration data store 110, IP network 112, distributed resource coordination component 114, subscription level determination component 202, IP address determination component 204, request cancellation component 302, resource release component 304, throttling component 402, cluster of nodes 900, nodes 910, 912, 914, and 916, node 1000, etc.) disclosed herein with respect to systems 100-500 and 900-1000 can each comprise at least a portion of the computer 1102. The system bus 1108 couples system components comprising, but not limited to, the system memory 1106 to the processing unit 1104. The processing unit 1104 can be any of various commercially available processors. Dual microprocessors and other multiprocessor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 comprises read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during startup. The RAM 1112 can also comprise a high-speed RAM such as static RAM for caching data.

The computer 1102 further comprises an internal hard disk drive (HDD) 1114, which internal hard disk drive 1114 can also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations comprises at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

A number of program modules can be stored in the drives and RAM 1112, comprising an operating system 1130, one or more application programs 1132, other program modules 1134 and program data 1136. All or portions of the operating system, applications, modules, and/or data can also be cached in the RAM 1112. It is noted that the specification can be implemented with various commercially available operating systems or combinations of operating systems.

A user can enter commands and information into the computer 1102 through one or more wired/wireless input devices, e.g., a keyboard 1138 and/or a pointing device, such as a mouse 1140 or a touchscreen or touchpad (not illustrated). These and other input devices are often connected to the processing unit 1104 through an input device interface 1142 that is coupled to the system bus 1108, but can be connected by other interfaces, such as a parallel port, an IEEE 1394 serial port, a game port, a USB port, an infrared (IR) interface, etc. A monitor 1144 or other type of display device is also connected to the system bus 1108 via an interface, such as a video adapter 1146.

The computer 1102 can operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically comprises many or all of the elements described relative to the computer 1102, although, for purposes of brevity, only a memory/storage device 1150 is illustrated. The logical connections depicted comprise wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 is connected to the local network 1152 through a wired and/or wireless communication network interface or adapter 1156. The adapter 1156 can facilitate wired or wireless communication to the LAN 1152, which can also comprise a wireless access point disposed thereon for communicating with the wireless adapter 1156.

When used in a WAN networking environment, the computer 1102 can comprise a modem 1158, or is connected to a communications server on the WAN 1154 or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It is noted that the network connections shown are example and other means of establishing a communications link between the computers can be used.

The computer 1102 is operable to communicate with any wireless devices or entities operatively disposed in wireless communication, e.g., desktop and/or portable computer, server, communications satellite, etc. This comprises at least WiFi and Bluetooth® wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out; anywhere within the range of a base station. WiFi networks use radio technologies called IEEE 802.11 (a, b, g, n, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 5 GHz radio band at an 54 Mbps (802.11a) data rate, and/or a 2.4 GHz radio band at an 11 Mbps (802.11b), an 54 Mbps (802.11g) data rate, or up to an 600 Mbps (802.11n) data rate for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) comprising a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units. One or more processors can be utilized in supporting a virtualized computing environment. The virtualized computing environment can support one or more virtual machines representing computers, servers, or other computing devices. In such virtualized virtual machines, components such as processors and storage devices can be virtualized or logically represented. In an aspect, when a processor executes instructions to perform "operations", this could comprise the processor performing the operations directly and/or facilitating, directing, or cooperating with another device or component to perform the operations In the subject specification, terms such as "data store," data storage," "database," "cache," and substantially any other information storage component relevant to operation and functionality of a component, refer to "memory components," or entities embodied in a "memory" or components comprising the memory. It is noted that the memory components, or computer-readable storage media, described herein can be either volatile memory or nonvolatile memory, or can comprise both volatile and nonvolatile memory. By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components can reside within a process and/or thread of execution and a component can be localized on one computer and/or distributed between two or more computers. As another example, an interface can comprise input/output (I/O) components as well as associated processor, application, and/or API components.

Furthermore, the terms "user," "consumer," "client," and the like are employed interchangeably throughout the subject specification, unless context warrants particular distinction(s) among the terms. It is noted that such terms can refer to human entities or automated components/devices supported through artificial intelligence (e.g., a capacity to make inference based on complex mathematical formalisms), which can provide simulated vision, sound recognition and so forth.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can comprise but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    a processor; and
    a memory that stores executable instructions that, when executed by the processor, facilitate performance of operations, comprising:
        determining level data based on a result of comparing a number of internet protocol (IP) addresses claimed by a node device of the system with a defined number of IP addresses, and based on a determined number of serviceable node devices within a clustered system; and
        in response to determining that the level data satisfies a defined oversubscription criterion, causing the node device to release a resource associated with a first IP address to facilitate balanced IP address distribution across the clustered system.

2. The system of claim 1, wherein the defined number of IP addresses is a maximum number of IP addresses that are allowed to be claimed by the node device.

3. The system of claim 2, wherein the maximum number of IP addresses that are allowed to be claimed by the node device comprises a division of a total IP address count that has been assigned to the system by the determined number of serviceable node devices.

4. The system of claim 2, wherein the serviceable node devices are capable of serving traffic destined for the first IP address.

5. The system of claim 4, wherein the determining that the level data satisfies the defined oversubscription criterion comprises:
    determining that the number of IP addresses claimed by the node device is greater than the maximum number of IP addresses.

6. The system of claim 1, wherein the operations further comprise:
    in response to the determining that the level data satisfies the defined oversubscription criterion, canceling an outstanding IP address request transmitted from the node device to a distributed lock coordination component that is employable to grant IP address requests.

7. The system of claim 1, wherein the resource is a first resource, and wherein the operations further comprise:
    releasing a second resource associated with a second IP address on expiration of a defined time period after the releasing of the first resource.

8. The system of claim 1, wherein the operations further comprise:
    in response to the determining that the level data satisfies the defined oversubscription criterion, throttling requests for exclusive access to a second IP address.

9. The system of claim 1, wherein the operations further comprise:
    periodically determining the determined number of serviceable nodes; and
    in response to determining a change in the determined number of serviceable nodes, updating the level data.

10. The system of claim 1, wherein the system comprises node devices that implement distributed IP management, and wherein, with the distributed IP management, IP addresses are procured by the node devices and assigned on a first-come, first-serve basis.

11. A method, comprising:
    determining, by a system that comprises a processor, level data based on comparing a number of internet protocol (IP) addresses that have been claimed by a node device of the system with a defined number of IP addresses, and based on a determined number of serviceable node devices within a clustered system that are capable of serving traffic destined for a first IP address; and
    in response to determining that the level data satisfies a defined criterion, canceling, by the system, an outstanding IP address request transmitted from the node device to a distributed lock coordination component that is employable to grant IP address requests.

12. The method of claim 11, further comprising:
    in response to the determining that the level data satisfies the defined criterion, facilitating, by the system, a controlled release of resources associated with the IP addresses claimed by the node device.

13. The method of claim 11, wherein the defined number of IP addresses is a maximum number of IP addresses that are allowed to be claimed by the node device.

14. The method of claim 13, wherein the determining the level data comprises:
    determining that the node device is undersubscribed in response to determining that the number of IP addresses that have been claimed by the node device is less than the maximum number of IP addresses.

15. The method of claim 13, wherein the determining the level data comprises:

determining that the node device is at-subscription in response to determining that the number of IP addresses that have been claimed by the node device is equal to the maximum number of IP addresses.

16. The method of claim 13, wherein the determining the level data comprises:
   determining that the node device is oversubscribed in response to determining that the number of IP addresses that have been claimed by the node device is greater than the maximum number of IP addresses.

17. A non-transitory computer-readable storage medium comprising instructions that, in response to execution, cause a system that comprises a processor to perform operations, comprising:
   determining level data based on a result of comparing a number of internet protocol (IP) addresses that have been claimed by a node of the system with a defined number of IP addresses, and based on a determined number of serviceable nodes within a clustered system; and
   in response to determining that the level data satisfies a defined criterion, canceling an outstanding IP address request transmitted from the node to a distributed resource coordination component that is employable to grant IP address requests.

18. The non-transitory computer-readable storage medium of claim 17, wherein the operations further comprise:
   in response to the determining that the level data satisfies the defined criterion, facilitating a controlled release of resources associated with respective IP addresses claimed by the node.

19. The non-transitory computer-readable storage medium of claim 17, wherein the operations further comprise:
   in response to the determining that the level data satisfies the defined criterion, prohibiting a request, other than the outstanding IP address request, for an additional IP address to be transmitted from the node to the distributed resource coordination component.

20. The non-transitory computer-readable storage medium of claim 17, wherein the serviceable nodes are capable of serving traffic destined for an IP address.

* * * * *